USO12182079B1

(12) United States Patent
Peterson

(10) Patent No.: US 12,182,079 B1
(45) Date of Patent: *Dec. 31, 2024

(54) SYSTEM AND METHOD FOR STORING AND READING A DATABASE ON FLASH MEMORY OR OTHER DEGRADABLE STORAGE

(71) Applicant: Yellowbrick Data, Inc., Mountain View, CA (US)

(72) Inventor: Jim Peterson, San Jose, CA (US)

(73) Assignee: Yellowbrick Data, Inc., Mountain View, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/834,637

(22) Filed: Jun. 7, 2022

Related U.S. Application Data

(63) Continuation of application No. 16/780,814, filed on Feb. 3, 2020, now Pat. No. 11,354,279, which is a continuation of application No. 15/591,000, filed on May 9, 2017, now Pat. No. 10,552,386.

(60) Provisional application No. 62/333,597, filed on May 9, 2016.

(51) Int. Cl.
*G06F 16/18* (2019.01)
*G06F 12/02* (2006.01)
*G06F 16/182* (2019.01)
*G06F 16/2455* (2019.01)

(52) U.S. Cl.
CPC ...... *G06F 16/1847* (2019.01); *G06F 12/0246* (2013.01); *G06F 16/1844* (2019.01); *G06F 16/24557* (2019.01)

(58) Field of Classification Search
CPC ............. G06F 16/1847; G06F 12/0246; G06F 16/1844; G06F 16/24557
See application file for complete search history.

(56) References Cited

U.S. PATENT DOCUMENTS

| 2010/0328115 A1* | 12/2010 | Binnig | G06F 16/24557 341/51 |
| 2011/0202733 A1* | 8/2011 | Wright | G06F 3/0676 711/E12.001 |

* cited by examiner

*Primary Examiner* — Masud K Khan
(74) *Attorney, Agent, or Firm* — Innovation Partners LLC; Charles E. Gotlieb

(57) ABSTRACT

A system and method stores a database file into Flash memory or other write-constrained storage. The system and method can decompress the data to use to process a request by only decompressing data it determines, via metadata, might correspond to a criteria in the request.

18 Claims, 11 Drawing Sheets

SYSTEM AND METHOD FOR STORING AND READING A DATABASE ON FLASH MEMORY OR OTHER DEGRADABLE STORAGE

RELATED APPLICATIONS

This application is a continuation of U.S. patent application Ser. No. 16/780,814 entitled, "System and Method for Storing and Reading a Database on Flash Memory or Other Degradable Storage" filed by Jim Peterson on Feb. 3, 2020, which is a continuation of U.S. patent application Ser. No. 15/591,000 entitled, "System and Method for Storing and Reading a Database on Flash Memory or Other Degradable Storage" filed by Jim Peterson on May 9, 2017, which claims the benefit of U.S. provisional patent application Ser. No. 62/333,597 entitled, "Method and Apparatus for Storing and Reading a Database on Flash Memory or Other Degradable Storage" filed by Jim Peterson on May 9, 2016 and is related to U.S. patent application Ser. No. 15/272,259 entitled "System and Method for Storing a Database on Flash Memory or Other Degradable Storage" filed by Jim Peterson on Sep. 21, 2016, and each is hereby incorporated by reference in its entirety.

FIELD OF THE INVENTION

The present invention is related to computer hardware and software and more specifically to computer software and hardware for reading a database file.

BACKGROUND OF THE INVENTION

Flash memory is a type of memory that can only be written or erased a limited number of times before it cannot be rewritten or erased. This can make flash memory suboptimal for storing a database. What is needed is a system and method for storing and reading a database in flash or other type of storage in which writing and rewriting is less desirable.

SUMMARY OF INVENTION

A system and method stores a database in a data file into flash or other similar memory or storage that is degraded each time it is written, thereby limiting the number of times it may be written. The data file is logically divided into portions, and then each portion is processed as described herein, though in one embodiment, there is only one "portion" consisting of the entire file.

The columns in each portion are sampled to identify a compression strategy for the column within that portion, for example by indicating a number of sequential values that are the same value, such as null, for multiple rows of the column. The compression strategy may optionally include a dictionary mapping a limited range of values to a more compact representation of each value. If a dictionary is used for the compression strategy for a column, the dictionary is written to a 32 kilobyte dictionary buffer.

The compression strategy for a column can be identified as applying to the entire column without exception, the entire column with exceptions, or may not be identified for the column, based on how varied the data is in the column. Additional sampling may be performed if the initial sampling indicates the data may be sufficiently simple so that a single compression strategy for the entire column is warranted, or whether no compression strategy for the column can be or should be identified.

Each column in the selected portion is processed by selecting a certain number of rows in the column, not past the end of the file or portion, referred to as a compression unit, identifying the range of values in the compression unit, and other metadata, such as the minimum and maximum value of the values in the rows in the compression unit. The values in the compression unit are compressed using the compression strategy, and optionally the minimum and maximum values. If a column compression strategy does not exist or does not apply to the entire column, a compression strategy is identified for the compression unit.

The compressed data and metadata for the compression unit are stored in a buffer of a fixed size, such as 32 kilobytes, in the flash or similar memory, with a new buffer in flash memory started following the prior buffer if there is insufficient capacity to store the compressed data and metadata for the column. Buffers may be written to flash one compression unit at a time, or they may be assembled in RAM and written to flash when convenient. Pointers to each buffer in flash memory are stored in RAM as the buffers are created, and the pointer is marked in RAM with the column identifier to which it corresponds if it points to the first compression unit of a column within the portion. This is repeated as many times as needed to process the entire column in the portion. As the column is processed, column metadata is updated if a higher maximum or lower minimum is located in the compression unit for that column so that the column metadata for any portion of the file includes the minimum and maximum for the column within the portion.

As each column is processed or thereafter, metadata for the entire column within the selected portion is identified, such as by generating bitmaps or bloom filters, and counts or fractions of null values in the column within the portion. Similar data may be identified for each buffer, and for each compression unit. This additional compression unit metadata is written to the buffer.

A series of 32 kilobyte pointer buffers are written to flash memory containing pointers to each buffer stored in flash memory containing the compression units and compression unit metadata. A header follows the series of pointer buffers, the header containing pointers to each of the pointer buffers. Following these pointers in flash memory are a series of column pointers, one for each column in the file, each containing the column name, and a pointer to the column metadata. The column metadata follows the column pointers, and stored with the column metadata in flash memory is a pointer to the pointer in the pointer buffer containing the first compression unit for the column within the portion of the file and, optionally, a pointer to the pointer in the pointer buffer that points to the first part of a dictionary for part or all of the column if one was identified for the column. A pointer to the header is provided or stored in flash memory, and the process is repeated for each portion of the file. The header, column pointers and column metadata may be used to access the compression units stored in the file containing all of the information written to flash memory as described herein.

A system and method identifies columns relevant to a request for data from a database that includes a criteria, and then uses the metadata for those columns for each portion of the file to determine whether the data in the portion meets or may meet the criteria. For each portion that meets or may meet the criteria, the metadata for the first buffers in the portion for all relevant columns are read and a determination is made as to whether the data corresponding to the metadata meets or could meet the criteria across each column. For example, if the criteria requires two columns X and Y summing to at least 10, and the maximum value of column X is 3 and the maximum value of column Y is 4, the columns could not meet the criteria. However, if the maximum value of columns X is 3, and the maximum value of column Y is 7, at least one row corresponding to the buffers may meet the criteria, even though it is uncertain whether any row actually does.

Each buffer corresponds to one or more compression units in the file, and has a starting compression unit index and an ending compression unit index. If the criteria is met or may be met, the current analysis point and the smallest ending compression unit index among all such buffers analyzed is stored as the beginning and end of an applicable set of compression unit indices in an applicable list. Pointers to the buffers used may also be stored associated with the applicable set of rows. If the criteria is not met, the largest ending compression unit index in the buffer corresponding to the metadata that failed the criteria is stored in an inapplicable list. Thus, if there are two criteria X>5 and Y>5 and the metadata for the buffer of the column corresponding to X indicates that the highest value of X is 4 but the metadata for the buffer of the column corresponding to Y indicates the highest value is 8, if the X buffer spans compression unit indices 1-100 and the Y buffer spans compression unit indices 1-200, 100 is stored in the inapplicable list. The current analysis point and the ending compression unit index of the X buffer may be stored in the inapplicable list. If the criteria is a combination of columns, such as X+Y>12, 100 would be stored in the inapplicable list.

The current analysis point for a range is one greater than the highest value ending range among both lists before storage of a new range. The current analysis point is initialized as the compression unit index just prior to the portion of the file.

The process is then repeated, starting from the buffers across each relevant column for the applicable rows that contain the current analysis point, until there are no further sets of buffers in the portion, at which point the process is repeated for the next portion until all portions have been so analyzed.

Buffers corresponding to the ranges on the applicable list are read, and metadata for the compression units corresponding to each index in each range applicable list for all applicable columns are checked to determine if the compression units at that index for all of the columns relevant to the criteria of the request meet or may meet the criteria, for each compression unit index within a range on the applicable list.

For each compression unit index in which the metadata for all the compression units in all columns relevant to the query indicated that the compression unit data meets or may meet the criteria, the compression units corresponding to the columns relevant to the criteria for any such index are decompressed, and the individual rows of the compression units within all relevant columns are checked for actual correspondence with the criteria of the request. Identifiers of such rows are provided. In one embodiment, checking of the individual rows is performed by a separate process that receives the decompressed compression unit data and the starting row identifier, for each compression unit index.

The process of checking the metadata of the compression units against the criteria of the request, decompressing compression unit data if the metadata indicates the compression unit data at a compression unit index across all relevant columns may meet or meets the criteria of the request, checking the rows of the decompressed compression unit against the criteria of the request, and providing identifiers of such rows, is repeated for each compression unit whose index is on the applicable list.

In another embodiment, the system and method checks the metadata for the column or columns applicable to the request at each level of data encapsulation (portion, buffer and compression unit) to determine whether the metadata for one component at that level indicates that satisfaction of a criteria corresponding to the request is at least possible. If the metadata indicates that satisfaction of the criteria at one level is possible, examination of the next lower level is performed until the compression unit level is reached, and otherwise the part of the file corresponding to the component (portion, buffer or compression unit) at that level is skipped. If satisfaction of the criteria is at least possible at the compression unit level, decompression into RAM for the compression units for all columns corresponding to the request is performed so that the request may be attempted on such decompressed compression units.

In one embodiment, columns that may be combined to satisfy a criteria may be tested while aligned together, to match up the same rows at the compression unit level, and may be assumed to pass the tests at other levels in which their rows are not aligned with one another.

In one embodiment, a 'primary column' is selected and tested against the criteria first, with the other columns only tested if the primary column is determined to meet or possibly meet the portion of the criteria directed at that column. The primary column may be a column selected for its propensity to fail the criteria, so that the failure can be detected early, without additional processing of the other columns.

DETAILED DESCRIPTION OF A PREFERRED EMBODIMENT

Figure 1:
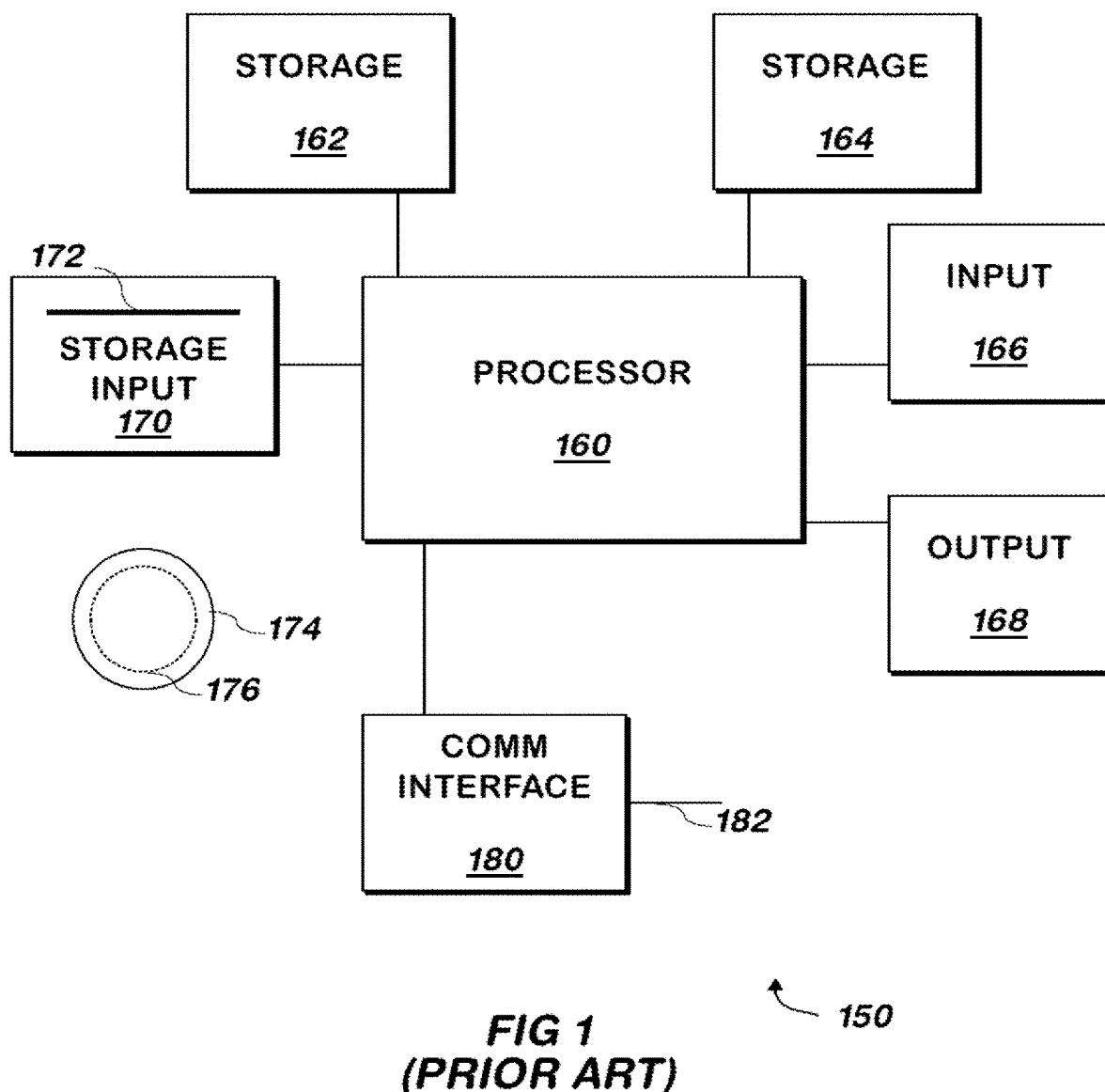
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor system coupled to a memory system, the systems including the processor 160 and storage 162, 164 described herein.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, 7 or 8) commercially available from MICROSOFT Corporation of Redmond Washington or a Macintosh computer system running the OS X operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2A:
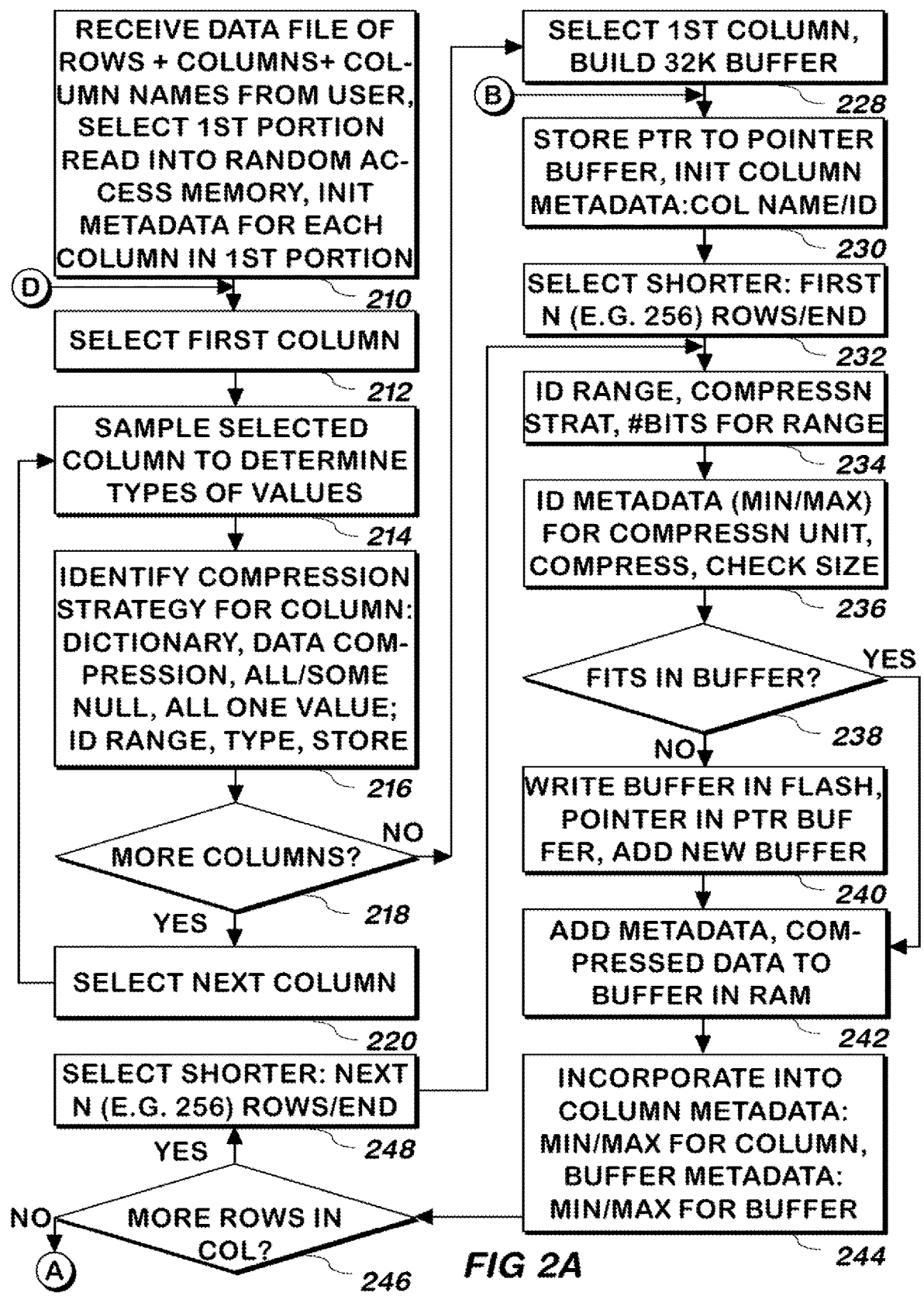
FIG. 2, consisting of FIG. 2A, FIG. 2B.
FIG. 2C is a flowchart illustrating a method of storing a database on flash memory or other similarly write-constrained storage according to one embodiment of the present invention.
Figure 2B:
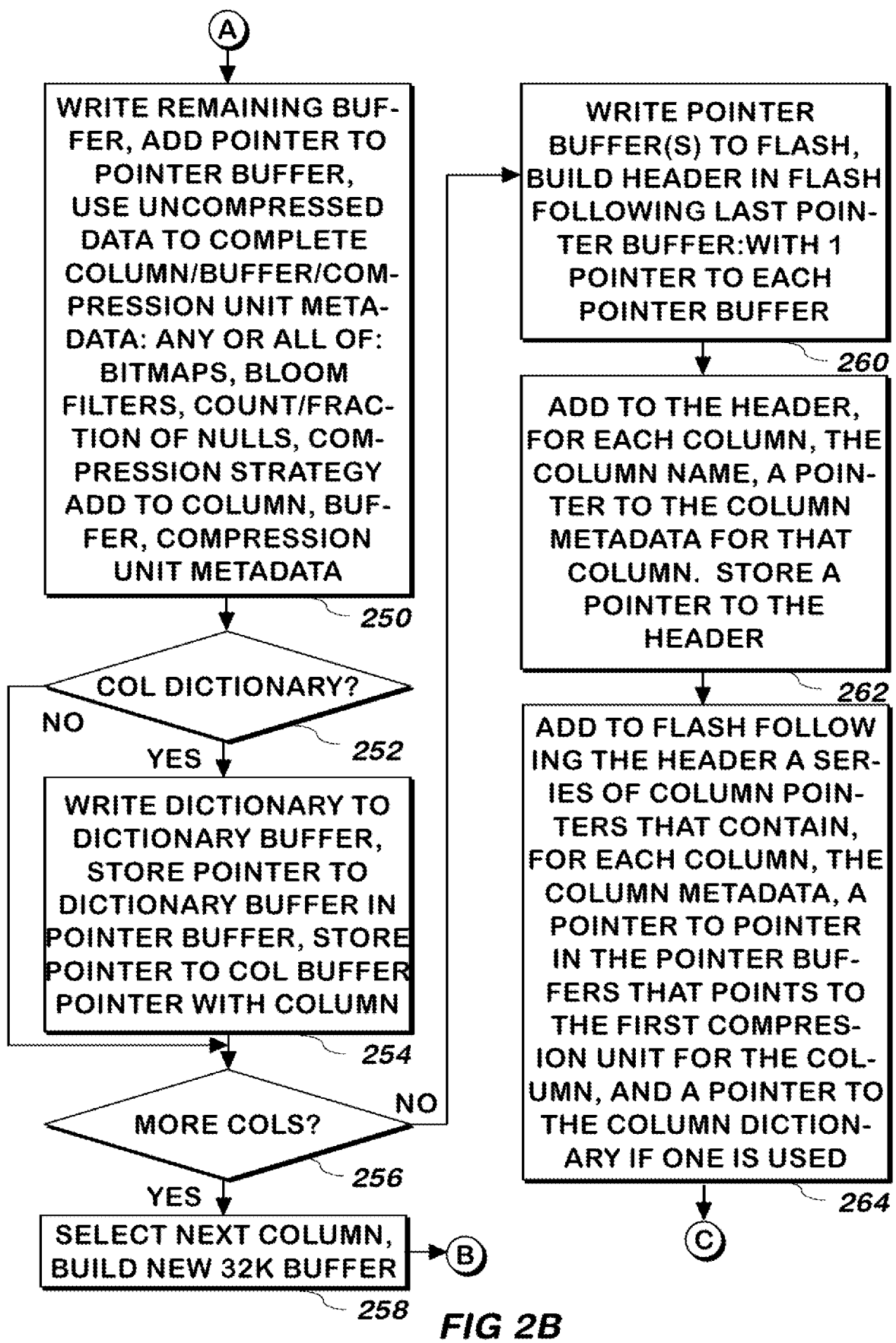
Figure 2C:
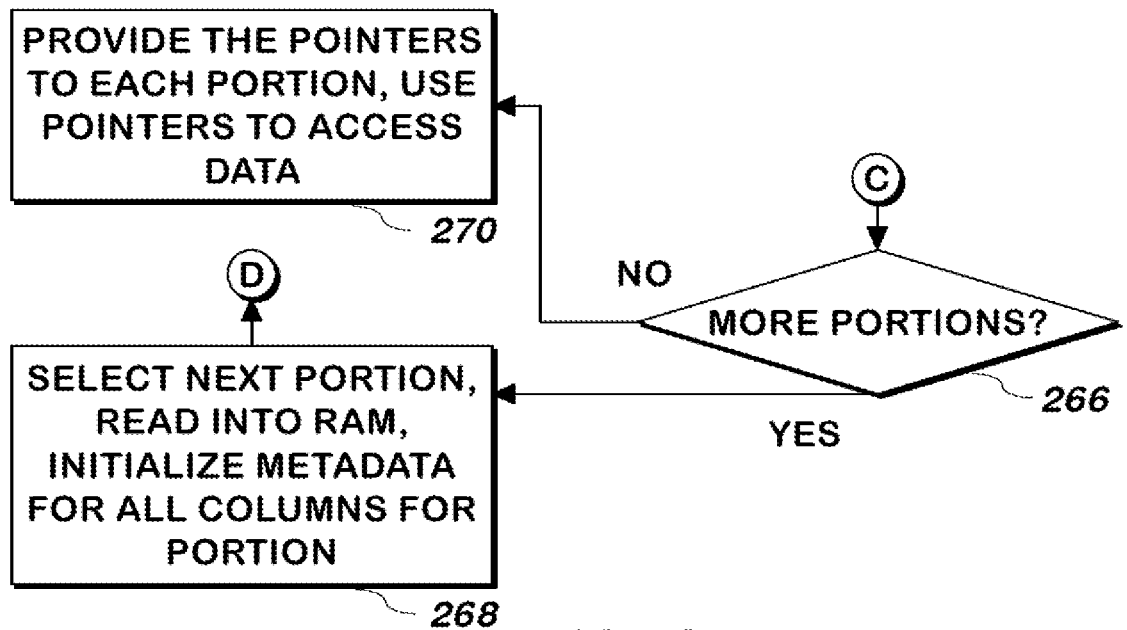
Figure 2:
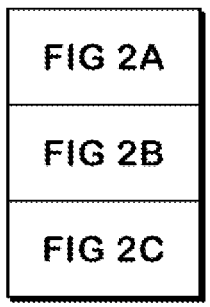

Referring now to FIG. 2, consisting of FIG. 2A, FIG. 2B, and FIG. 2C, a method of storing database data on flash memory or other memory that can be worn out from repeated writing and/or erasing, is shown according to one embodiment of the present invention. Although flash memory is described herein, the present invention applies to other types of memory that have a limited number of writes or erases possible before they cannot perform one or both functions or nonvolatile storage that is substantially slower to write than the fastest nonvolatile storage, and such memory is referred to herein as "flash memory". Conventional random access memory or disk storage is not considered flash memory, although it may not operate forever. A database file consisting of multiple rows of multiple columns is received 210 from a user and read into conventional random access memory, which does not have the wear-out problem of flash memory, or other types of memory into which the data file will ultimately be written, as described herein. In one embodiment, the data file includes column names, but if the column names are not received, other column identifiers, such as the number of the column, starting at zero from the left-hand side, may be used in place of the column name, as described herein.

In one embodiment, the file may be logically split into portions, and the portions processed one at a time, as described herein. A portion may be a number of rows, percentage of rows in the file, or an amount of data read in whole rows up to the amount, unless the end of the file is reached before the number of rows is encountered, in which case the portion is the rows following the end of any prior portion to the end of the file. The rows may be allocated to different portions on the basis of a number or percentage of rows of the file, a maximum amount of data, or they may be allocated to improve the compression to enable a smaller resulting file in flash memory. For example, if a block of the first set of the rows in the file have mostly whole numbers in the values of each column, and then a block of rows have mostly nulls in the columns, followed by another block of rows with mostly whole numbers in the columns, the partition boundaries may be made at the boundaries of these blocks, to allow different compression strategies to be used for the different characteristics of the blocks, as described in more detail below.

In the embodiment in which multiple portions of the file are used, the first portion is selected, and certain metadata for each column in the selected portion is initialized, for example, by identifying the portion (0, 1, 2, etc.) as part of step 210.

The first column, such as column zero, is selected 212. Some of the rows in the selected column are sampled 214 in order to determine the types and range of values stored in the column. The types of values may be conventional data types, in which no, all, or some of the values are null, the range of non-null values may be limited in number (e.g. days of the week, or month of the year) or not so limited (e.g. real numbers), and the values may have a small range of values or a much larger range of values. Sampling may occur only within the selected portion, or throughout all portions of the file in which case steps 212 through 220 need only be performed once.

A compression strategy is identified 216 using the type and range of the data in the selected column, optionally within the selected portion of the file, using conventional compression identification techniques. For example, if all of the sampled values were null, the compression strategy may be to indicate that all of the values of the selected column are null, and therefore the values of the rows of that column need not be stored and are not stored. If the non-null values were limited in number of different values, the compression strategy may be to map the limited number of values to a small numeric value using a dictionary, such as mapping the months of the year to the values zero through 11. If some of the values are null, the compression strategy may include reserving a special value that indicates one or more consecutive values of the rows of the column are null, along with the number of such consecutive rows. The compression strategy and the range of values (or an indicator that the range is essentially unlimited) and any dictionary or a dictionary type indicator from commonly seen types of data that can be compressed using a dictionary (e.g. months of the year, days of the week, etc.) are stored as column metadata along with the column name or identifier for the selected column as part of step 216. A dictionary indicates for each value in the compressed file, the corresponding value of the data from the file as received, such as 0=January 1=February, etc. If a dictionary for the column is identified, the dictionary is written to an available dictionary buffer in flash memory: in one embodiment, each dictionary buffer is 32 kilobytes, and as many buffers as needed may be added. A dictionary buffer may hold no more than one dictionary in one embodiment, or in another embodiment, a single dictionary buffer may hold multiple dictionaries for multiple columns.

In one embodiment, the compression strategy for the column has a type, which is one of the following: 0) the compression strategy that applies to the entire column for the current portion of the file, 1) there is no compression strategy for the column for the selected portion of the file, as the compression strategy should be calculated for each compression unit, or 2) there is a default compression strategy for the column for the selected portion, however, the default may be overridden for some compression units, such as a minority of them. The compressions strategy will be assigned type 0 if the data appears sufficiently homogeneous that a single compression strategy would apply to most, or all, of the selected column for the selected portion. The compression strategy will be assigned type 1 if the data appears heterogeneous so that a single compression strategy is unlikely to apply to even a majority of the file. The compression strategy will be assigned type 2 if the data appears somewhat homogeneous but a single compression strategy is likely to apply to a majority of the file. In one embodiment, additional reading of the file beyond the initial sampling may occur if the data in the sampling appear homogeneous to distinguish between type 0 and type 2.

If there are more columns in the file 218, the next such column is selected 220, and the method continues at step 214 using the newly selected column. Otherwise 218, the method continues at step 228.

At step 228, the first column in the received file is selected, and a 32 kilobyte buffer is built in random access memory. 32 kilobytes is used herein as a size of various entities, but other sizes can be used with the present invention. A conventional bitmap and/or bloom filter or other conventional statistical measure is also part of the metadata for the column within the selected portion, built as described below.

A series of 32K pointer buffers, each containing pointers to the 32K buffers when stored on flash as described below is maintained in RAM for storage onto flash memory. Each time processing for a new column for the selected portion of the file is started, a pointer to the same pointer buffer that will contain the first pointer to the 32K buffer for that column for the selected portion is stored in RAM associated with the column and portion identifier 230.

Metadata for the column within the selected portion that is not already initialized is initialized 230 into the buffer. In one embodiment, the metadata for the column within the selected portion includes any or all of the column name, the compression strategy for the column identified as described above, the compression strategy type indicating the applicability of the compression strategy for the column for the selected portion to the compression units in that column for that portion and the minimum and maximum values for the column, which are initialized to their maximum and minimum possible values, respectively.

The shorter of: a) the first 256 rows of the column beginning at the start of the portion or b) the entire column from the start of the selected portion to the end of the selected portion or c) the entire column to the end of the file, are selected 232. Although 256 rows are used in one embodiment, a smaller or larger number of rows, or an indeterminate number of rows, for example, the largest number of whole rows that can fit into an available amount of memory, may be used. The selected part of the selected column is referred herein as a "compression unit". The range of values in the selected compression unit is identified, and the number of bits required or otherwise to be used to compress the data of that range is identified and optionally a compression strategy for the compression unit is identified, along with a dictionary for the compression unit, if applicable 234. A compression strategy for the compression unit would be identified if the type of compression strategy for the currently selected column is other than the compression strategy applies to the entire column for the selected portion of the file. A compression strategy for the compression unit would not be identified if the type of column compression strategy for the selected column and portion of the file indicates that the compression strategy is the default, and the compression strategy for the selected compression unit is the same strategy as for the selected column and selected portion.

Metadata for the selected rows of the compression unit is identified and the selected rows of the column are compressed using the compression strategy, using conventional techniques 236. In one embodiment, this metadata includes the range of the data in the selected rows of the column (e.g. minimum and maximum), and any compression strategy and dictionary identified.

In one embodiment, the minimum of the range may be compressed to zero in some or all compression strategies, and thus the compression involves subtracting the minimum of the selected rows from each value. It is noted that this compression technique means that two of the same values in the same column that are each part of different compression units can be compressed into two different values in their respective buffers, as different minimums may be subtracted from each such value before compression. This can also or instead mean that two of the same values in different compression units of the same column could have different numbers of bits to represent the two same values in different compression units. Compression units within the same column and portion of the file may not have a different compression strategy, though the compression strategy may vary by compression unit within the same portion of the file, and the different compression strategies are stored in the buffer as part of the metadata for each compression unit. Different columns may use the same or different compression strategies. It is also noted that different portions of the file may employ different compression strategies for the same column, for example using all null values in one portion, and values having a minimum and maximum value that is nonzero for at least one other portion, each for the same column in the file.

The size of the metadata and the compressed data is checked against the remaining space in the most-recently created 32 KB buffer as part of step 236. The remaining space excludes available space in the buffer that is reserved for buffer metadata, in one embodiment. If the compressed data and metadata for the compression unit fits in the remaining space in the existing buffer 238, the metadata for the compression unit and the compressed data are added to the buffer in RAM 242 and the method continues at step 244. Otherwise 238, the buffer is written to flash memory, a pointer to the buffer in flash memory is appended to the pointer buffer in random access memory (RAM) (or, if the pointer would not fit in the pointer buffer, a new pointer buffer is appended to the prior pointer buffer in RAM and the pointer, and subsequent pointers for the portion are added to the new pointer buffer, until the new pointer buffer is full, and the process repeats), a new 32 KB buffer is built in RAM 240, and the method continues at step 242. As part of step 240, if a new pointer buffer is added, a pointer to the start of that pointer buffer is stored in RAM.

At step 244 the metadata for the compression unit of the column are incorporated into the metadata for the column within the selected portion, and metadata for the buffer, which is initially considered to have a minimum of the maximum possible representation and a maximum of the minimum possible representation. To incorporate metadata for the compression unit of the column into the metadata for the column within the selected portion, if the minimum for the compression unit is less than the current metadata minimum for the column within the selected portion, the minimum for the compression unit is substituted for the minimum for the selected column within the selected portion. If the maximum for the compression unit is greater than the current metadata maximum for the column within the selected portion, the maximum for the compression unit is substituted for the maximum for the selected column within the selected portion. To incorporate metadata for the compression unit of the column into the metadata for the buffer, if the minimum for the compression unit is less than the current metadata minimum for the buffer, the minimum for the compression unit is substituted for the minimum for the buffer. If the maximum for the selected compression unit is greater than the current metadata for the buffer, the maximum for the compression unit is substituted for the maximum for the buffer.

If there are more rows in the selected column 246, the next 256 rows of the selected column (up to the end of the selected column) are selected 248 and the method continues at step 234 using the newly selected rows for the selected column. Otherwise 246, the method continues at step 250 of FIG. 2B.

At step 250 of FIG. 2B, the last buffer is written to flash and a pointer to it is written to the pointer buffer in RAM as described above (adding a pointer buffer if needed). Additionally, the uncompressed data is used to complete the metadata for the selected column, each of the buffers containing data for the selected column, and for each compression unit for the selected column. The completed metadata is written with the other corresponding metadata. The metadata added may include any or all of a conventional bitmap, a conventional bloom filter, and a count of null rows or fraction of null rows to the total number of rows. The metadata for the column corresponds to the data in the column, the metadata for the buffer corresponds only to all of the data in that buffer and the metadata for the compression unit corresponds only to the data in that compression unit.

It is noted that one or more parts or all of step 250 may be performed at other steps of the method, and may not be required to be performed after each column has been processed as described herein. For example, metadata for the compression unit can be completed at step 236, and/or some of the metadata for the selected column and the buffer may be identified at each pass of step 236. Some or all of this additional metadata for the compression unit may be written into the buffer with the other metadata for the compression unit in step 236 or at another time and the metadata for the buffer may be written to the buffer with the other compression unit information in step 240 or at another time. In the embodiment in which this additional metadata for the compression unit of the selected column is not identified before the size is checked, space for such metadata may be reserved for such metadata and included in the calculation as to whether sufficient space exists, and otherwise it may be identified and used to check the size of the metadata with the compressed data.

If a column dictionary was identified 252, either applying to the whole column or applying to the whole column with exceptions, the column dictionary is stored in a series of one or more 32 kilobyte buffers in flash memory and a pointer to the column dictionary is stored in the pointer buffer 254 and otherwise 252, the method continues at step 256. A pointer to each buffer of the column dictionary is retained associated with the column to which it corresponds, for use as described below as part of step 254. As described herein, the pointer to the column dictionary is inserted into the pointer buffer at the end of the pointers to the buffers for that column. However, in another embodiment, steps 252 and 254 may be inserted between steps 230 and 232 to add the pointer to the column dictionary ahead of the pointers to the compression units for that column in the pointer buffer, with step 232 following the no branch of step 252.

If there are more columns in the file 256, the next column is selected, a new 32 kilobyte buffer is built 258, and the method continues at step 230, using the newly selected column and buffer. In another embodiment, a new buffer is not automatically selected at the end of each column, though a new buffer is used if the data and metadata doesn't fit in the remaining space of the existing buffer as described above. If there are no more columns in the file 256, the method continues at step 260.

At step 260, the one or more pointer buffers in RAM are written to flash memory, a header is built in one or more 32 kilobyte buffers in flash memory that follows the pointer buffers. The header includes pointers to each of the pointer buffers in flash memory. Following the header, in one or more additional 32 kilobyte buffers in flash memory, or as part of the end of the header are written column pointers, one for each column in the file, containing the column name, and a pointer to a location of column metadata for that column in flash memory, described below 262. A pointer to the header is stored in RAM.

The column metadata for each of the columns is written 264 to flash memory in one or more 32 kilobyte buffers following the last buffer containing the column pointers. Adjacent to the column metadata for a column is written a pointer to the buffer pointer in the pointer buffer corresponding to the first compression unit in the column for the selected portion of the file, and optionally a pointer to the first pointer in the pointer buffer to a column dictionary for the selected column, if one was used, as part of step 264.

Referring now to FIG. 2C, if there are more portions in the file 266, the next portion is selected, the portion is read into RAM, the metadata for all columns for the portion is initialized, as described above 268, and the method continues at step 212 of FIG. 2A, using the newly selected portion. Otherwise 266, the pointers to the header for each portion are provided and used to access data in the file in flash memory. In one embodiment, the pointers to the header of each of the portions of the file may be written to flash memory as part of step 270. The header (and column pointers if they are not part of the header) may be read and used in conjunction with the column metadata, buffer metadata and compression unit metadata to determine the need to read a certain column or compression unit in the flash, and to locate such data to be read from the file.

To decompress the compression units while reading the file, the compression unit compression strategy and dictionary takes precedence over any compression strategy for the column within the portion of the file.

System

Figure 3:
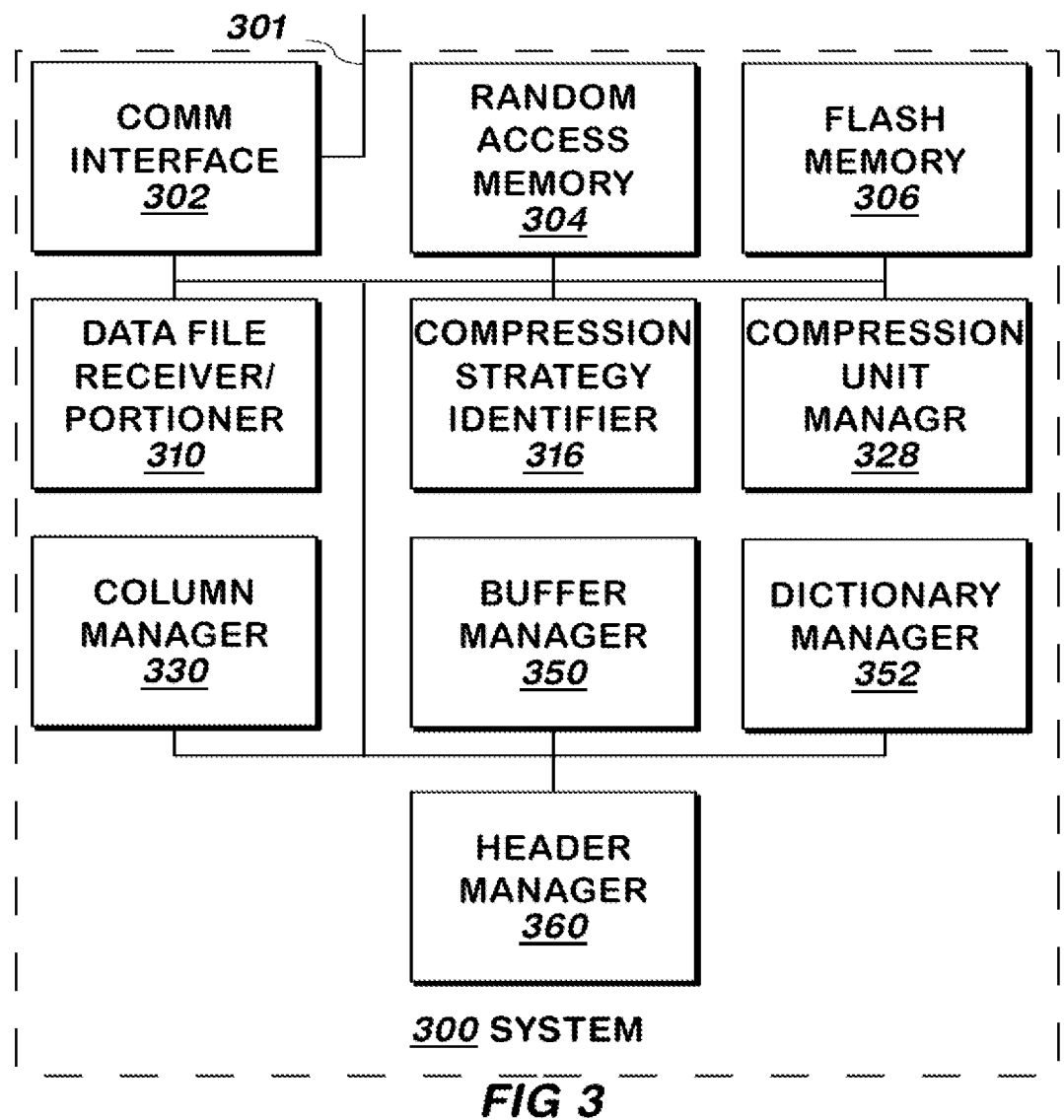
FIG. 3 is a block schematic diagram of a system, including Random Access Memory, for storing a database on flash memory or other similarly write-constrained storage according to one embodiment of the present invention.
Figure 4A:
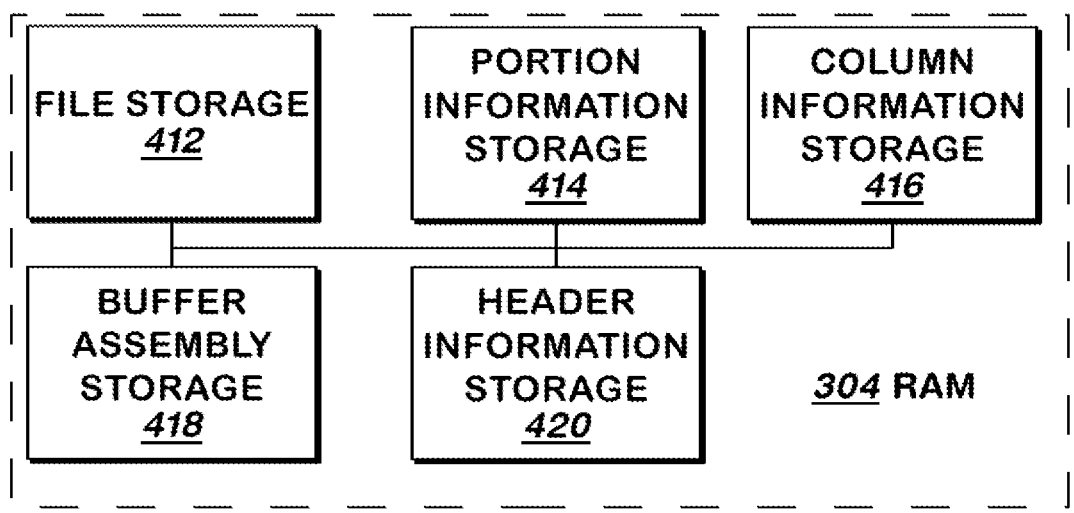
FIG. 4A is a block schematic diagram of the random access memory of FIG. 3 according to one embodiment of the present invention.
Figure 4B:
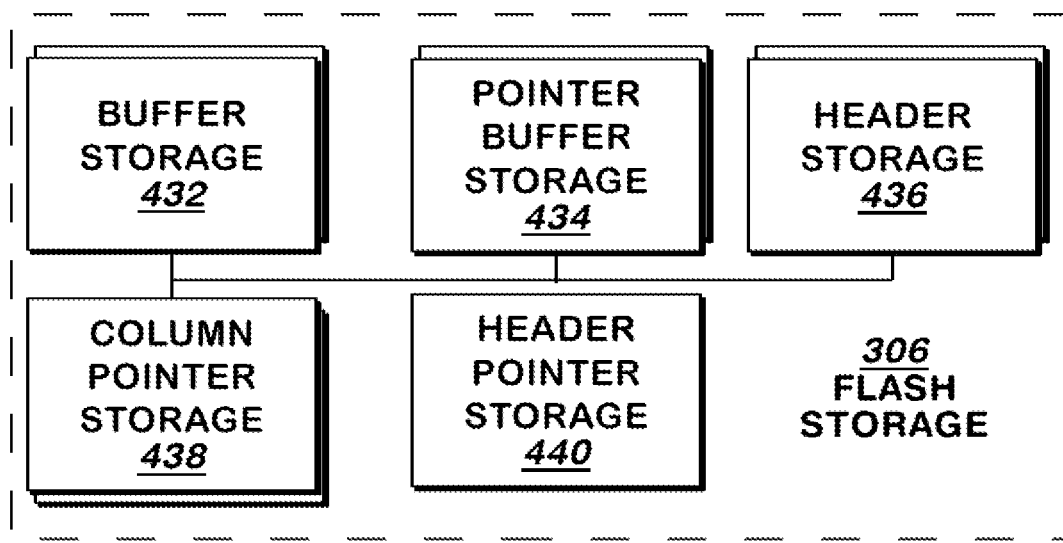
FIG. 4B is a block schematic diagram of the flash memory of FIG. 3 according to one embodiment of the present invention.

FIG. 3 illustrates a system for storing database in flash memory according to one embodiment of the present invention. The system of FIG. 3 includes random access memory 304, which includes conventional random access memory, and flash memory 306, which includes flash storage as described above. FIG. 4A illustrates random access memory 304 of FIG. 3 in more detail according to one embodiment of the present invention, and FIG. 4B illustrates the flash storage 306 of FIG. 3 in more detail according to one embodiment of the present invention. Except for the storage elements 304, 306, other elements of FIG. 3 may incorporate a conventional hardware computer processor or other conventional circuitry, programmed or wired to operate as described herein.

Referring to FIGS. 3, 4A and 4B, communication interface 302 includes a conventional TCP/IP communication interface running suitable communication protocols, such as conventional disc drive protocols, TCP/IP and Ethernet and is coupled via input/output 301 to one or more disk drives and a conventional network such as an Ethernet network and the networks that make up the conventional Internet. In one embodiment, all communication into or out of system 300 is made via input/output 301 of communication interface 302.

Data file receiver/portioner 310 receives or reads a database file into file storage 412 of RAM 304, either a portion at a time, or in its entirety, and identifies and selects the first portion of the file as described above, and stores boundary information for the first portion in portion information storage 414 of RAM 304. Data file receiver/portioner 310 initializes the column metadata for each column in the portion of the file in column information storage 416, and includes the name of the column, or assigns an identifier to the column, for each such column in the file it reads. Data file receiver/portioner 310 signals compression strategy identifier 316 with a handle to the file in file storage 412 and an indication of the portion (i.e. starting and ending rows in the portion).

When it receives the handle and indication of the portion, compression strategy identifier 316 performs the sampling of the portion of the file described above to identify a compression strategy, a compression strategy type, and optionally, identifies a data dictionary, for each column, and stores them associated with the column name or column identifier in column information storage 408 of RAM 304. Compression strategy identifier 316 then signals column manager 330 with the handle to the file and the indication of the portion.

When signaled, column manager 330 selects the first column, builds a buffer in buffer assembly storage 418 of RAM 304, marks the buffer as the first buffer for the column, initializes to zero the amount of data stored in the buffer stores a pointer to the buffer in a pointer buffer in buffer assembly storage 418 as the current buffer pointer, initializes the minimum and maximum metadata for the selected column as described above and provides the handle of the file, the indication of the portion, an indication that the first row in the portion is to be the next row selected, and the column identifier to compression unit manager 328.

When it receives such information, compression unit manager 328 selects the compression unit: the shorter of 256 rows or to the end of the portion of the file or the end of the file (if portions aren't used) in file storage 412, scans the column corresponding to the column identifier it received within the compression unit it selected, identifies the range of values in the column within the compression unit, identifies the compression strategy for the compression unit if the compression type stored in column information storage 416 for the column allows it or indicates the column compression strategy is to be used if one exists, and identifies the number of bits that will accommodate the range of values, stores such metadata into a temporary workspace in buffer assembly storage 418 corresponding to the current buffer pointer in buffer assembly storage 418, generates an indication of the selected rows (e.g. row number of first and last row) and signals buffer manager 350 with the handle to the file, indication of the portion, identifier of the column, a pointer to the metadata, and the indication of the rows selected.

When signaled, buffer manager 350 compresses the compression unit containing the rows in the file corresponding to the handle it received of the column defined by the identifier of the column and the indication of the rows selected, and checks the size of the compressed data from the compression unit and the size of the metadata in the temporary workspace to determine if it will fit (after allowing space for the buffer metadata) into the buffer corresponding to the current buffer pointer in buffer assembly storage 418. If so, it stores the compressed compression unit data and the metadata for the compression into the buffer in buffer assembly storage 418 pointed to by the current buffer pointer, updates the amount of data in the buffer stored in buffer assembly storage 418, incorporates the metadata for the compression unit into the metadata for the column in column information storage 416 and the metadata for the buffer stored in buffer assembly storage 418 in RAM 304 as described above, and signals compression unit manager 328 with the handle to the file, identifier of the column, the indication of the portion, and an indication that the row after the last row in the indication of the rows selected is to be selected.

If the compressed data and compression unit metadata will not fit into the buffer, buffer manager 350 writes into buffer storage 432 in flash storage 306 the buffer in buffer assembly storage 418 corresponding to the current buffer pointer in buffer assembly storage 418, and adds a pointer to the buffer in flash to the pointer buffer in buffer assembly storage 418, creating a new pointer buffer following the prior pointer buffer if the pointer buffer is full, writes into buffer storage 432 in flash storage 306 the buffer in buffer assembly storage 418 corresponding to the pointer it receives, builds a new buffer in buffer assembly storage 418 and stores the compressed compression unit data and the metadata for the compression into the new buffer in buffer assembly storage 418, stores in buffer assembly storage 418 a pointer to the new buffer as the current buffer pointer in place of the existing current buffer pointer, initializes to the amount of data it stored in the buffer as the amount of data stored in the buffer, incorporates the metadata for the compression unit into the metadata for the column in column information storage 416 and the metadata for the new buffer stored in buffer assembly storage 418 as described above, and signals compression unit manager 328 with the handle to the file, the identifier of the column, the indication of the portion, and an indication that the row after the last row in the indication of the rows selected it received is to be selected.

In one embodiment, buffer manager 350 writes the indication of the rows selected as the compression unit with the other metadata for the compression unit, and such information is incorporated into the buffer and column metadata with the other information incorporated.

Compression unit manager 328 checks to see that there are more rows in the section of the file as indicated in portion information storage 414 and if so, repeats the process described above starting with the row after the last row it selected. If there are no more rows in the section of the file, compression unit manager 328 signals buffer manager 350 with the handle to the file, and the identifier of the column and an indication that the portion of the column has been fully processed.

When so signaled, buffer manager 350 writes into buffer storage 432 in flash storage 306 the buffer in buffer assembly storage 418 corresponding to the current buffer pointer in buffer assembly storage 418, and adds a pointer to the buffer in flash to the pointer buffer in buffer assembly storage 418, creating a new pointer buffer following the prior pointer buffer if the pointer buffer is full. (It is noted that the current buffer pointer may be passed as a parameter rather than remaining in buffer assembly storage 418).

As it writes a buffer, buffer manager 350 checks to see if the buffer is marked as the first buffer for the column, and if so, it also stores into column information storage 416 a pointer to the pointer (in pointer buffer storage 434) to the buffer into column information storage, associated with the column identifier it received.

Buffer manager 350 then completes the metadata for the buffers for the column, the buffer, and any compression unit for the column in buffer storage 432 for the metadata for the buffer or compression unit) or column storage 416 for the metadata for the column, such as by writing bitmaps, bloom filters, counts or fractions of nulls in the respective component, storing such additional metadata with the other metadata for such component. In one embodiment, such additional metadata for the compression unit is written to the buffer in buffer assembly storage 418 by compression unit manager 328, and/or is written to the buffer metadata for an old buffer in buffer storage 432 by buffer manager 350 each time the old buffer is stored when a new buffer is created, and when it writes the last buffer for a column for the current portion. Buffer manager 350 then signals dictionary manager 352 with the identifier of the column.

When so signaled, dictionary manager 352 identifies in column information storage 416 whether there is a dictionary for the column corresponding to the identifier it receives, and if so, stores the dictionary into one or more dictionary buffers in buffer storage 432 in flash storage 306, stores the pointer or pointers to the dictionary buffer or buffers into the pointer buffer in buffer assembly storage 418 in RAM 304 marked with the column identifier of the column to which the dictionary buffer or buffers correspond, and signals column manager 330. Dictionary manager 352 stores into column information storage 416, associated with the identifier of the column it received, a pointer to the pointer or pointers to the dictionary buffer in buffer assembly storage 418. In one embodiment, the dictionary pointer or pointers can be inserted at a different location in buffer assembly storage 418, such as before the other pointers for the column.

When so signaled, column manager 330 identifies whether there are more columns using the column identifiers in column information storage 416 and if so, selects the next column for the portion and repeats the process described above, internally storing the column identifier of the selected column each time. If there are no more columns, column manager 330 signals header manager 360.

When signaled, header manager 360 stores the one or more pointer buffers in buffer assembly storage 418 in RAM 304 into a set of one or more pointer buffers in pointer buffer storage 434 in flash memory 306, and stores into header information storage 420 pointers to each of these buffers. Header manager 360 then stores these pointers into header storage 436 following the pointers in the pointer buffers.

Header manager 360 then stores into column pointer storage 438 which follows header storage 436 in flash memory 306 the column pointers containing, for each column in the file, the column metadata, the pointer to the pointer in pointer buffer storage 434 pointing to the buffer containing the first compression unit for the column, and the pointer to the first pointer or all pointers in pointer buffer storage 434 pointing to any column dictionary, if one applies to the column, all such information being taken from column information storage 416.

Header manager 360 stores into header pointer storage 440 a pointer to the beginning of header storage 436 for the portion of the file, and optionally, a portion identifier of the file. Header manager 360 may also store the last row number of the file for each portion with the pointer to the portion. Header manager 360 then signals data file receiver/portioner 310, which selects the next portion of the file, if any, and repeats the process described above for the next portion. When there are no more portions, the pointers to the portions for the entire file will have been stored in header pointer storage 440. There is one buffer storage 432, one pointer buffer storage 434, one header storage 436 and one column pointer storage 438 for each portion of the file, in one embodiment.

The one corresponding to the currently processed portion is used for storage of information for that portion in such embodiment.

Figure 5:
FIG. 5, consisting of FIGS. 5A, and 5B, is a flowchart illustrating method of providing data stored in a flash or other similar memory that may be applicable to a request according to one embodiment of the present invention.
Figure 5A:
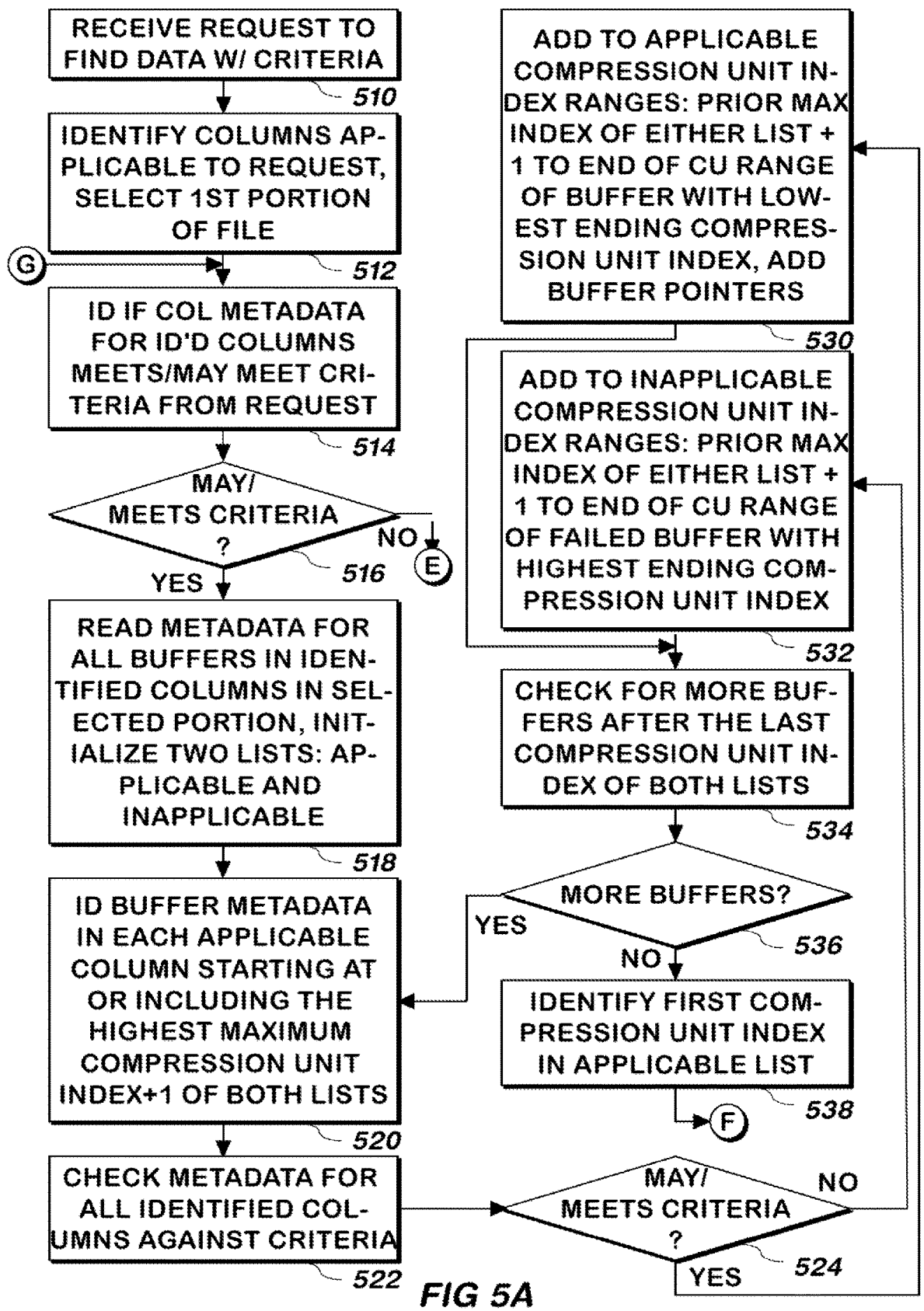
Figure 5B:
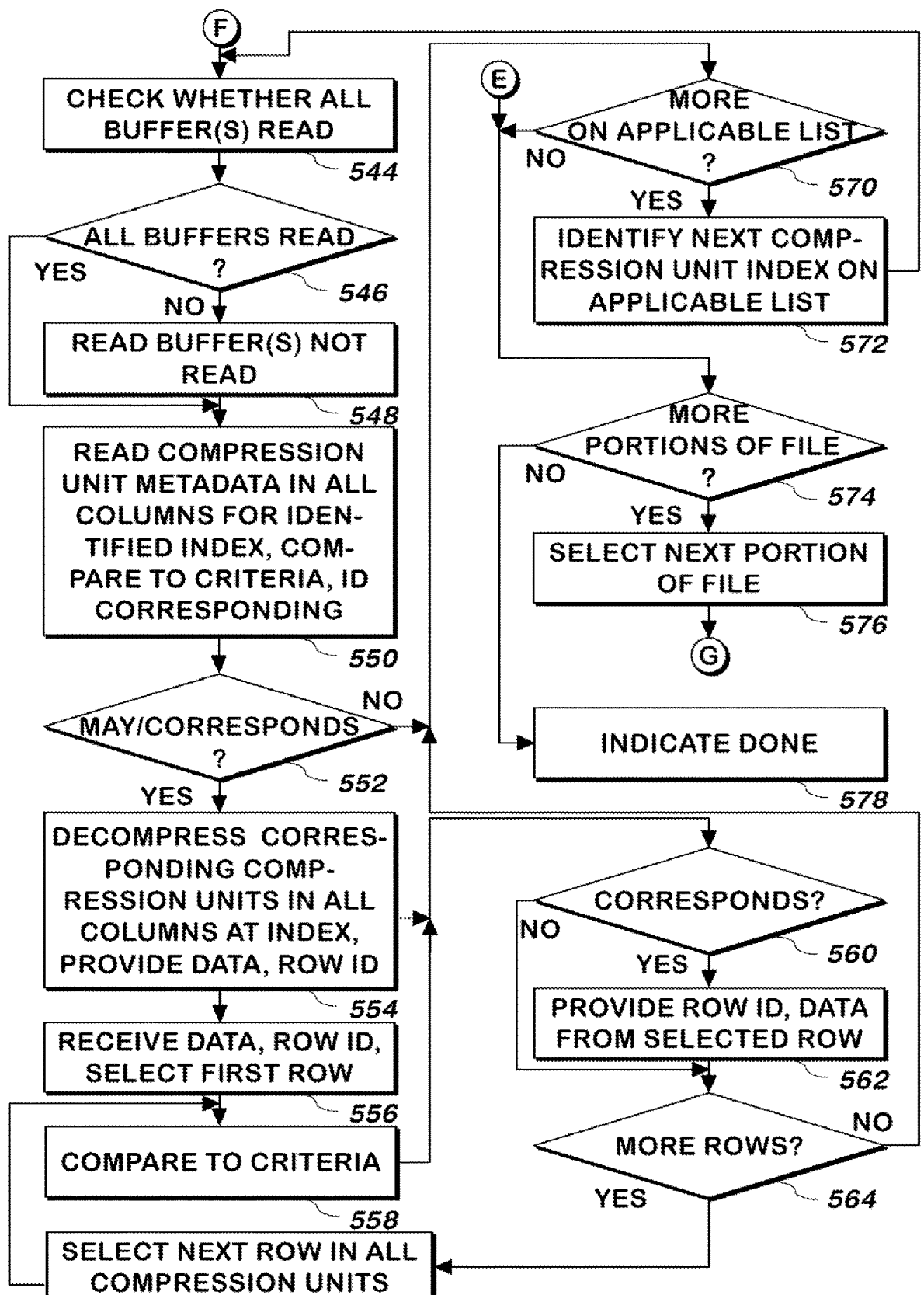

FIG. 5, consisting of FIG. 5A, and FIG. 5B, is a flowchart illustrating a method of providing data that meets or may meet a criteria according to one embodiment of the present invention. A request to locate data is received 510 with a criteria to be used to locate the data. Such criteria may include a conventional SQL query. The request may include an identifier of the file from which such data should be located, and all activities described herein operate on such file.

Columns applicable to the request are identified, and the first portion of the file is selected 512. Columns applicable to the request are those corresponding to the criteria, with other columns not referenced in the criteria not being applicable to the request. In one embodiment, the file metadata described herein may allow the mapping of a column name to a column identifier used to reference the columns as described herein.

A determination is made as to whether the column metadata for the columns applicable to the request in the selected portion of the file meets or may meet the criteria specified with request 514. If the criteria specifies a value, metadata indicates that the column meets or may meet the criteria if the value specified is between the minimum and maximum value of the column specified by the metadata, or if a bitmap or Bloom filter indicates that the value is contained within the column. If the criteria specifies a range of values, metadata indicates that the column meets or may meet the criteria if the range of values is included between the minimum and maximum values of the column specified by the metadata. Other techniques for identifying whether the values of data in the column meets or may meet the criteria from the request may be used. If none of the values in at least one of the columns meets or may meet the criteria 516, the method continues at step 574, and otherwise 516, continues at step 518.

At step 518, the metadata for all buffers in the identified columns in the selected portion of the file are read, and two lists are initialized. In one embodiment, the two lists are an 'applicable list', and an 'inapplicable list'. The applicable list contains ranges of compression unit indices for compression units that have been identified as meeting, or possibly meeting the criteria, and the inapplicable list contains ranges of compression unit indices, or the last compression unit index for compression units that have been determined not to meet the criteria. Both lists are initialized to indicate that there are no compression unit indices or ranges of compression unit indices in the list, such as by indicating that the highest compression unit index range in each list is a fictional compression unit index that precedes the first actual compression unit index.

The buffer metadata corresponding to the compression unit index that is one greater than the highest compression unit index in each of the two lists is identified 520 for each column applicable to the query. Each such buffer corresponding to the metadata identified contains the compression unit corresponding to the index. For example, if the highest compression unit index from the two lists is 96 and 99, the buffer metadata will be the metadata for the buffer containing compression unit 100 for each of the identified columns. The buffer metadata is checked 522 to determine whether all of the buffers correspond or may correspond to the criteria from the request in a manner similar to that used as described above, except that the buffer metadata is used instead of the column metadata. If so 524, the applicable list is appended 530 with a range having a beginning that is equal to the compression unit index that was one greater than the highest of both lists before such appending, and an ending that is equal to the compression unit index corresponding to the lowest ending compression unit index among the buffers whose metadata was identified in step 520. For example, if there are two columns identified and the buffers containing compression unit index 100 include one buffer containing compression units with indices from 98 to 105 and the buffer for the other column contains compression units with indices from 99 to 110, the range 100-105 is added to the applicable list. The method continues at step 534. In one embodiment, pointers to such buffers are stored associated with the range appended to the applicable list.

If the metadata from one or more such buffers does not correspond to the request 524, a compression unit range is appended 532 to the inapplicable list that has a beginning that has the same beginning as above, but has an ending that is the highest of the compression unit ranges of the buffers corresponding to the metadata that did not meet the applicable portion of the criteria. Using the same example as above, the range of 100-105 would be appended to the inapplicable list if only the metadata from the first column (but not the other column) failed to meet the criteria, the range of 100-110 would be appended to the inapplicable list if the buffer metadata for the other column failed to meet the criteria.

If a combination of columns is used for a criteria, e.g. X+Y>12 as described above, if such criteria failed, and the current buffer for column X had compression unit indices 1-100 and the current buffer for column Y had compression unit indices 1-200 and the criteria failed, 1-100 would be added to the inapplicable list. If an additional criteria was that, in addition to X+Y>12, Z>20, and the buffer for the Z column had compression unit indices 1-150, and it passed, 1-100 would still be added to the inapplicable list.

It isn't necessary to append the beginning of the range at all, nor is it necessary to append to the inapplicable list, as the inapplicable list need only contain the end of what would have been the most recent inapplicable list range, which in the examples above, is 105 or 110. The method continues at step 534. At step 534, a determination is made as to whether there are additional buffers in the identified portion of the file. An additional buffer is a buffer that contains a compression unit with an index that is one higher than the maximum compression unit index in the two lists, even if that buffer has been processed before. If so 536, the method continues at step 520 using the newly entered contents of the two lists. Otherwise 536, the first compression unit index is identified from the applicable list 538 and the method continues at step 544 of FIG. 5B. The compression unit index selected is the starting index of the first range in the applicable list.

At step 544, the buffers corresponding to the identified compression unit index in each column are identified, for example, from the pointers stored in the applicable list, and if all such buffers have not already been read 546, any unread buffer or buffers are read 548 and the method continues at step 550. If all the buffers have been read 546, the method continues at step 550.

At step 550, compression unit metadata for compression units that correspond to the range in the applicable list containing the selected index for the identified columns is read and the criteria from the request is applied to the metadata across all compression units having the same index in a manner similar to that described above, using the compression unit metadata to determine if the compression units correspond or may correspond to the criteria in the request and the compression units that correspond to the criteria across all columns for the same range of rows are identified from those in the range containing the selected index. If the metadata indicates that some or all of the rows in any compression unit in the range containing the selected index correspond or may correspond to the criteria 552, the method continues at step 554 and otherwise 552, the method continues at step 570.

At step 570, if there are more ranges in the applicable list, the next compression unit index for the next range from the applicable list is selected 572, and the method continues at step 544 using the newly selected compression unit index. Otherwise 570, the method continues at step 574. At step 574, if there are more portions of the file, the next portion of the file is selected 576 and the method continues at step 514 using the newly selected portion of the file. If there are no more portions of the file 574, the entity from which the request is received is informed there are no further rows or applicable compression units.

At step 554, the compression units identified in step 550 are decompressed using the compression strategy for that compression unit. The decompressed data from all such compression units identified as described above from all of the identified columns, and the row identifier of the first row in the compression unit, are identified as part of step 554. In one embodiment, the row identifier of the first row is the compression unit index multiplied by the number of rows per compression unit, in one embodiment, where compression unit indices and row identifiers start at zero. In one embodiment, the method continues at step 556 and in another embodiment, the method continues at step 570 as indicated by the dashed line in the Figure. In the latter case, the decompressed compression unit data and row identifier are provided to the entity from whish the request was received.

At step 556, the data from the decompressed compression units and row identifier of the first row is identified or received and the first row is selected. The data from the first row is compared to the criteria 558 and if it corresponds to the criteria 560, the data from the row selected and the row identifier are provided to the entity from which the request was received. The row identifier may be identified by adding to the row identifier identified in step 556, one less than a count of the rows processed from the compression unit.

Figure 6:
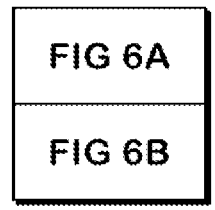
FIG. 6, consisting of FIGS. 6A, and 6B, is a flowchart illustrating method of providing data stored in a flash or other similar memory that may be applicable to a request according to another embodiment of the present invention.

If there are more rows in the compression units decompressed 564, the next row in all of the compression units decompressed in the most recent iteration of step 554 is selected 566, and the method continues at step 558 using the newly selected row. FIG. 6, consisting of FIGS. 6A, and 6B, is a flowchart illustrating method of providing data stored in a flash memory that may be applicable to a request according to another embodiment of the present invention.

Figure 6A:
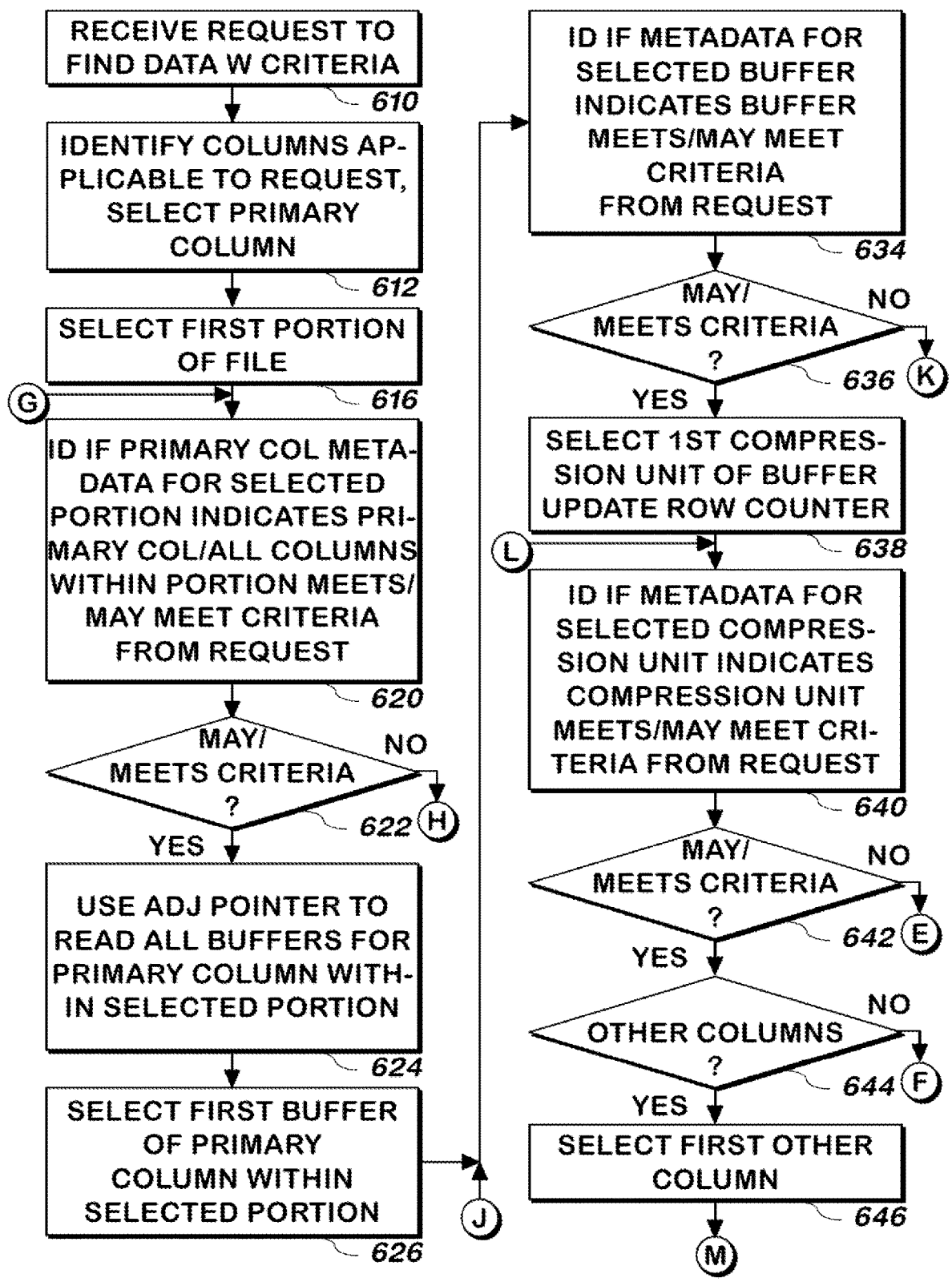
Figure 6B:
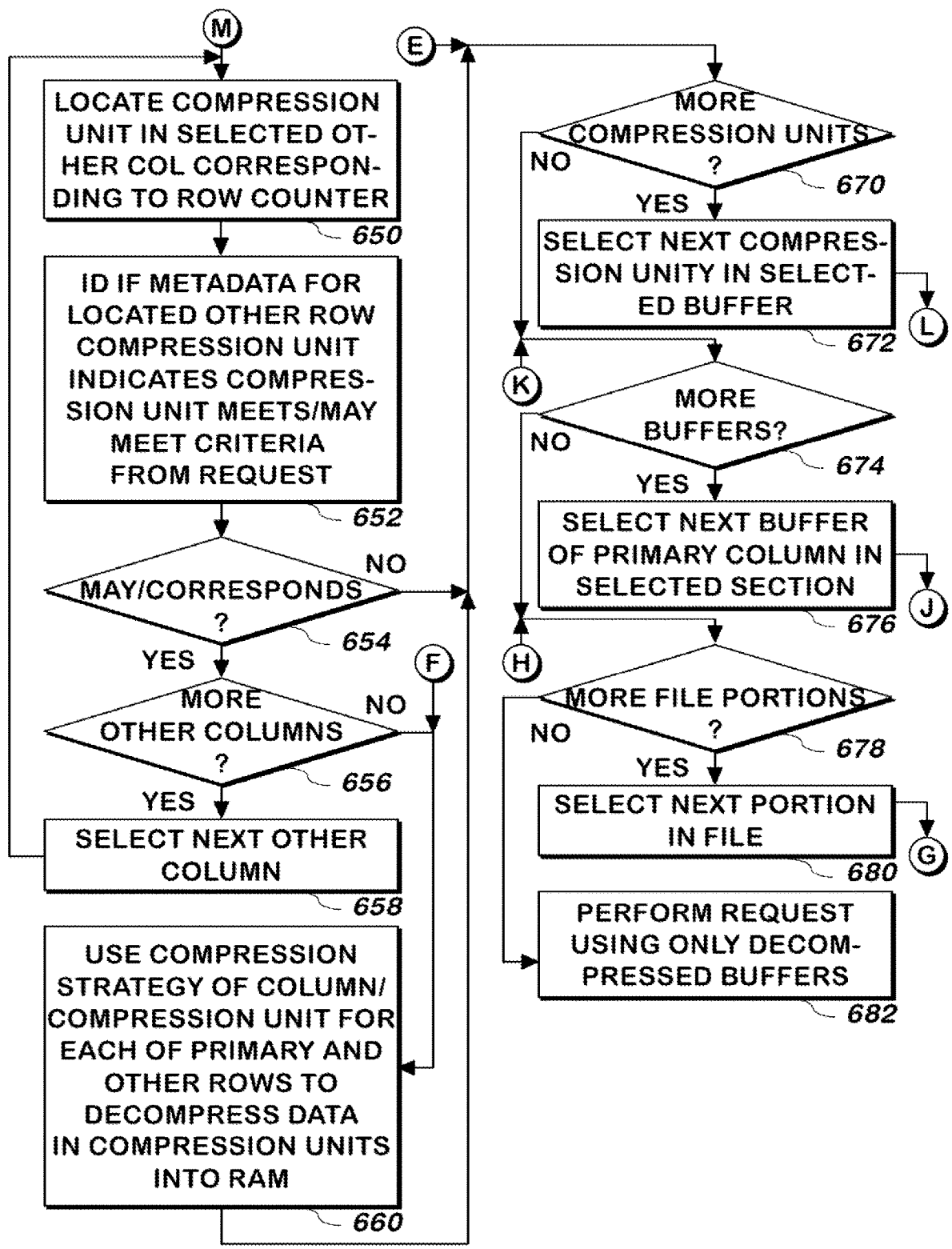

Referring now to FIG. 6, consisting of FIGS. 6A, and 6B, a method of providing data stored in a flash memory that may be applicable to a request is shown according to one embodiment of the present invention. The request to find data is received 610. In one embodiment, the request to find data consists of a criteria, such as conventional SQL query, and a reference to a file, such as a pointer to the set of headers for each portion of a file as described herein. Columns from the file applicable to the request are identified 612. In one embodiment, the columns applicable to the request are all of the columns specified in the query.

A primary column is selected from the columns of the file applicable to the request as part of step 612. In one embodiment, the primary column is selected from among the columns applicable to the request by identifying a column that appears least likely to apply to the request, such as one that has the highest percentage of null values, provided that such column having a null value is not part of the request. Columns specified to have null values as part of the request are selected as the primary column if the percentage of null values for such column are below the threshold, or is lower than the percentage of null values of other columns applicable to the request.

In one embodiment, two or more columns may be logically combined, and treated as a logical column if the criteria combines the columns in some way (e.g. the query specifies "where column A+Column B>5). In one embodiment, to make such determination, the portion metadata for the columns applicable to the request may be analyzed for multiple portions of the file, or for all portions of the file. In one embodiment, the primary column is a column that is not combined in the criteria unless all columns applicable to the request are combined with at least one other column.

The first portion of the file is selected 616. The portion metadata for the primary column of the selected portion of the file is investigated to determine whether the criteria applicable to the primary column is possible to be satisfied based on such portion metadata. For example, if column A is selected as the primary column, if the criteria indicates, in part, that column A must be greater than five to satisfy the criteria, and the maximum value of column A in the first portion of the file is four according to the metadata for that column within that portion, then the portion of the file cannot meet the criteria. In one embodiment, the criteria is applied to the portion metadata for all columns applicable to the request, not just the primary column, for the selected portion of the file in step 620. A logical column may be tested, at least at the portion level by determining if any row could satisfy the criteria. For example, if the criteria specifies columns A and B sum to at least 6, and the maximum of column A and B in the selected portion are each 2, then it is not possible for a row to satisfy the criteria. If the maximum of columns A and B are each 3 in the selected portion, then the portion may meet the criteria, even though no single row may have both A and B with a value of 3.

If the criteria applicable to the primary column is or may be met by the primary column as indicated by the metadata for that column within the selected portion, or the metadata for the selected portion indicates all columns aligned with the primary column applicable to the request do or may meet the criteria applicable to such columns 622, the method continues at step 624 and otherwise 622, the method continues at step 678. At step 624, the pointers to the buffers for the primary column within the selected portion are read.

The first buffer in the selected portion of the file is selected for the primary column 626. A determination is made from the metadata for the selected buffer whether any rows of the primary column corresponding to the selected buffer meet or may meet the criteria for the primary column 634.

The buffers from different columns are not necessarily aligned (e.g. they have the same start and end row numbers) to allow a determination to be made as to whether all columns may have any row that meets the criteria. However, the buffers may in fact be aligned, at least for some number of buffers. In such case, in one embodiment, the criteria is applied to the metadata for all columns that remain aligned with the primary column as part of step 634 and step 624 may include reading buffers from the selected portion, for all columns. A buffer from one row is aligned with that of another row if it, and any buffers of the same column in the same portion before it, have the same number of compression units.

If the buffer for the primary column, and optionally any other columns aligned with the primary column, meet or may meet the criteria 636, the method continues at step 638, and otherwise 636, the method continues at step 674.

Columns that are logical columns may be treated as a logical column for the test of steps 634 and 636 as long as their buffers are aligned with one another and with the primary column as described below. Once that is no longer the case, the columns are treated separately, or they may be ignored if it is not possible to identify whether their combination meets the criteria.

In still another embodiment, such columns are aligned at the compression unit level as described below and analyzed together, and the analysis as to whether the columns meet or may meet the criteria is not performed at the buffer level once the columns in a logical column are no longer aligned. For example, if the buffer for column A has 4 compression units and the buffer for column B has 6 compression units, and such columns are combined in the query, the test for whether the column meets or may meet the criteria would not be performed at the buffer level (steps 634 and 636) and would be considered to have passed, so that the method would continue at step 638.

At step 638, the first compression unit is selected from the selected buffer for the primary column. A determination is made from the metadata for the selected compression unit as to whether the criteria applicable to the primary column are met or can be met. In one embodiment, if the buffer for multiple columns are aligned, the determination is made from the metadata for the compression units of all aligned columns as to whether they meet or may meet the criteria applicable to them. If the selected compression unit for the primary column or all aligned columns meets or may meet the criteria 642, the method continues at step 644 and otherwise 642, the method continues at step 670.

At step 644, if there are more columns applicable to the request 644 that were not already considered as described above (e.g. because their buffers were not aligned with those from the primary column), the first such other column is selected 646 and the method continues at step 650 of FIG. 6B. Otherwise 644, the method continues at step 660 of FIG. 6B. The selected other column may be a single column or may be two or more logical columns as described above.

At step 650 of FIG. 6B, the compression unit for the selected other column that is aligned with (i.e. contain the same rows as) the selected compression unit for the primary column is located, for example, by scanning the compression units for the selected other column and then maintaining a pointer to it, associated with a count of compression units to use for the next scan of that column. A count of the compression units for the primary column is maintained as the column is processed as described herein. In the case of a logical column, the corresponding compression units for each of the columns corresponding to the logical column are located. In one embodiment, the metadata for each portion and for each buffer includes a count of the compression units in that portion or buffer to allow the count to be maintained more easily when a portion and/or buffer is skipped as described herein A determination is made as to whether the metadata for the located compression unit indicates that the selected other column meets or may meet the criteria corresponding to the request 652. If the metadata for the located compression unit indicates that the selected other column meets or may meet the criteria corresponding to the request 654, the method continues at step 656 and otherwise 654, the method continues at step 670.

In another embodiment, instead of processing the compression unit metadata for the primary column and then aligning the compression units in the other columns as described herein, all compression units are kept aligned with the selected compression unit of the primary column (i.e. the compression units corresponding to the same rows of the file are maintained) and the determination of whether a compression unit is applicable to the request is performed using all columns at the same time.

At step 656, if there are more other columns applicable to the request, the next other column or logical other column is selected 658, and the method continues at step 650 using the newly selected other column or other logical column. If there are no more other columns applicable to the request 656, the method continues at step 660.

At step 660, the compression strategy applicable to each compression unit in the column or columns applicable to the request are identified as described above either using the compression strategy for each respective column in the selected portion or using the compression strategy for each respective selected compression unit, and the data in the compression unit or units is decompressed using the applicable compression strategy and placed into RAM. The decompressed data may be provided to perform the request at this point, or may be provided all at once as part of step 682 described below. The method continues at step 670.

At step 670, if there are more compression units in the selected buffer for the primary column, the next such compression unit of the primary column 672 and the method continues at step 640 of FIG. 6A using the newly selected compression unit. Otherwise 670, if there are more buffers in the selection portion 674, the next such buffer is selected 676 and the method continues at step 634 of FIG. 6A. Otherwise 674, if there are more portions in the file 678, the next such portion is selected 680 and the method continues at step 620 of FIG. 6A. Otherwise 678, the request is performed using the decompressed buffers 682 if not already performed as described above.

Figure 7:
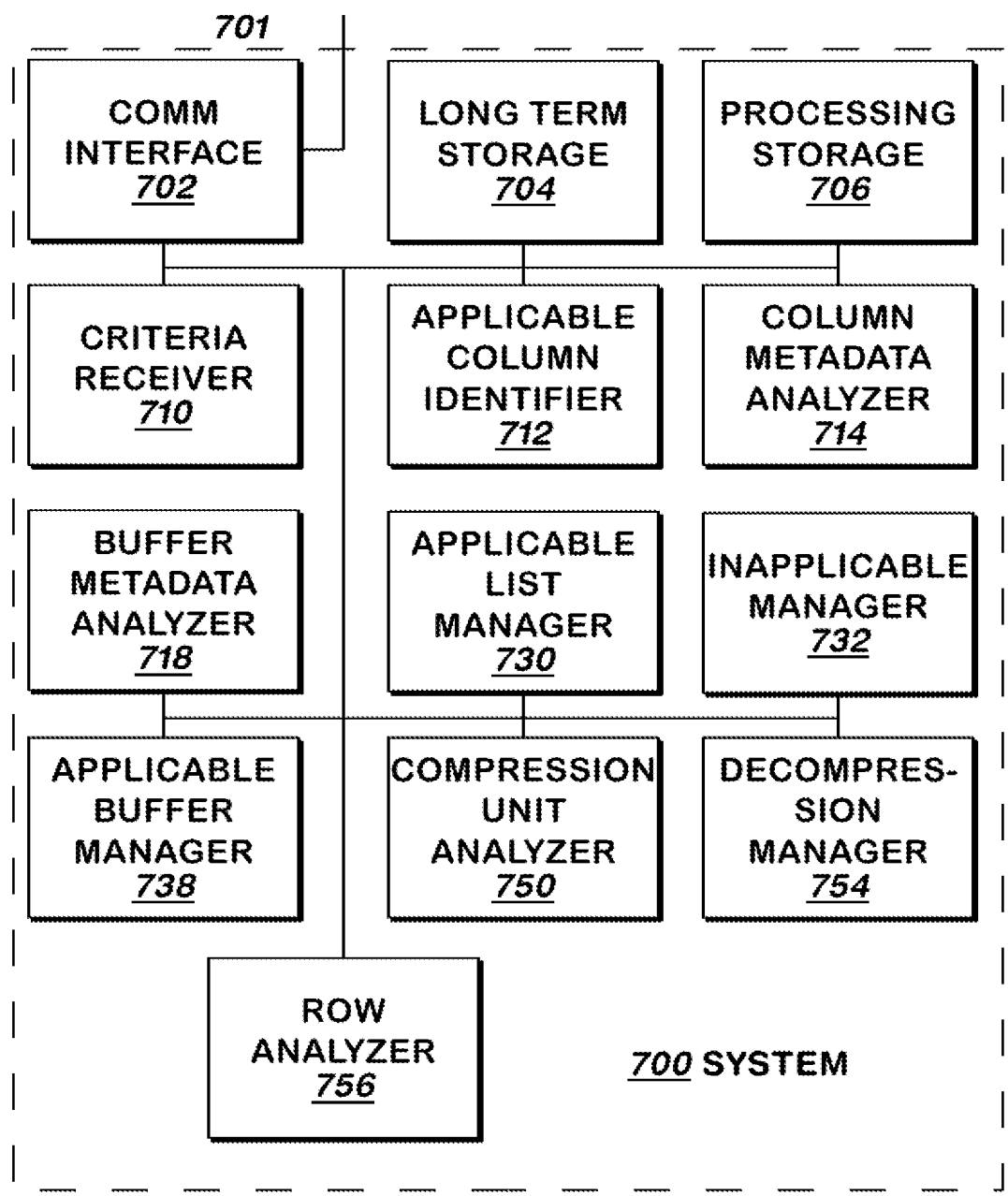
FIG. 7 is a block schematic diagram of a system for providing data stored in a flash or other similar memory that may be applicable to a request according to one embodiment of the present invention.

Referring now to FIG. 7, a system 700 for identifying compression units and/or rows of a file that correspond to a criteria is shown according to one embodiment of the present invention. The system includes elements containing a computer processor system, coupled to a memory system with software that, together, operates as described herein.

Communication interface 702 includes a conventional TCP/IP- and Ethernet-compatible communication interface running TCP/IP, Ethernet, and other conventional communication protocols. Communication interface 702 is coupled to a network, such as an Ethernet network coupled to the networks that make up the Internet, via input/output 701. In one embodiment, unless otherwise specified, all communication with the system of FIG. 7 is made via communication interface 702.

Criteria receiver/responder 710 receives a request to locate data, including the criteria (which may be in the form of an SQL statement or other query) as described above and identifier of the file to use as a data source in long term storage 704, such as flash or other similar memory or storage that is degraded each time it is written, thereby limiting the number of times it may be written. Criteria receiver 710 provides the information from the request and an identifier (e.g. IP address) of the entity from which the request was received to applicable column identifier 712.

When it receives such information from the request, applicable column identifier 712 identifies the applicable columns from the request using the criteria, as described above, and uses metadata from the file to identify column identifiers for each such identified applicable column as described above. Applicable column identifier 712 builds into a request object, the information from the request and the identifier of the entity it received, and the column identifiers and column names used in the request. In one embodiment, applicable column identifier 712 replaces the column names in the criteria with column identifiers in the request object. Applicable column identifier provides the request object to column metadata analyzer 714.

When it receives the request object, column metadata analyzer 714 selects the first portion of the file and reads the column metadata for the applicable columns for the selected portion of the file using the request object. Column metadata analyzer 714 then compares such column metadata to the criteria in the request to determine whether the columns in the selected portion meet or may meet the criteria as described above. If not, column metadata analyzer 714 selects the next portion of the file and repeats the process described herein.

If all of the columns in the selected portion meet or may meet the criteria in the request as described above, column metadata analyzer 714 places an identifier of the portion in the request object and provides the request object to buffer metadata analyzer 718.

When it receives the request object, buffer metadata analyzer 718 reads from long term storage 704 into processing storage 706 all of the buffer metadata for the portion of the file in the request object and initializes the applicable and inapplicable lists in the request object as described above. Buffer metadata analyzer 718 then selects the metadata for the buffer corresponding to the compression unit following the highest compression unit index on both lists for each applicable column, using the request object, and then checks the metadata for the buffers as described above to identify whether the buffers corresponding to the metadata meet or may meet the criteria. In the initial case of empty lists, buffer metadata analyzer 718 will select metadata for the buffers corresponding to the first compression unit in the portion for each applicable column in the request object.

If it determines the metadata meets or may meet the criteria in the request object, buffer metadata analyzer 718 provides the compression unit ranges of the buffers corresponding to the metadata it analyzed, optionally pointers to the buffers corresponding to the metadata, and the request object to applicable list manager 730 and otherwise provides the compression unit ranges of the buffers that could not meet the criteria and the request object to inapplicable manager 732.

When it receives such information, applicable list manager 730 maintains the applicable list in the request object as described above using the applicable list, the inapplicable list and the compression unit ranges it received and signals buffer metadata analyzer 718 with the request object.

When it receives such information, inapplicable manager 732 maintains the inapplicable list (which may be just a single compression unit index as described above) in the request object as described above using the applicable list, the inapplicable list and the compression unit ranges it received and signals buffer metadata analyzer 718 with the request object.

When signaled by applicable list manager 730 or inapplicable manager 732, buffer metadata analyzer 718 attempts to locate metadata for buffers that are in the portion of the file in the request object that include the compression unit index that is one higher than the maximum compression unit index in the applicable list and inapplicable list, for each column identified in the request object. In one embodiment, the metadata for each buffer includes the minimum and maximum compression unit index corresponding to the compression units in that buffer.

If there are more such buffers, buffer metadata analyzer 718 selects the buffer metadata for the buffers containing such compression units with such index from all applicable columns identified in the request object, and repeats the process described above, as described above.

If there are no more such buffers, buffer metadata analyzer 718 signals applicable buffer manager 738 with the request object. When signaled, applicable buffer manager 738 selects the first compression unit index on the applicable list and uses the pointers to the buffers on such list (or metadata for the buffers in processing storage 706, a pointer to which may be provided from buffer metadata analyzer 718 to applicable buffer manager 738) to read into processing storage 706, which may be conventional RAM as noted, from long term storage 704, which may be Flash memory as noted, all the buffers for all columns identified in the request objet containing the compression unit corresponding to the selected compression unit index, and reads from the buffers the compression unit metadata for the compression units corresponding to the selected index.

Applicable buffer manager 738 then provides pointers to the buffers in processing storage 706 it read, the compression unit index it selected, and the request object to compression unit manager 750, which compares the compression unit metadata in the buffers corresponding to the pointers it received from all columns for the selected compression unit index with the criteria in the request object as described above.

If the compression unit metadata compared by compression unit manager 750 indicates the compression units do not meet and could not meet the criteria, compression unit manager 750 signals applicable buffer manager 738.

If the metadata indicates that the data in the compression units of the selected compression unit index meets or may meet the criteria in the request object, compression unit manager 750 provides the compression unit index, the compression strategies for each compression unit from the compression unit metadata, pointers to the buffers in processing storage 706 containing the compression units corresponding to the metadata and the request object to decompression manager 754.

When it receives such information, decompression manager 754 uses the pointers to the buffers it receives to retrieve the compression units corresponding to the index, and uses the compression strategies it receives to decompress the compression units as described above. Decompression manager 754 provides the decompressed compression units, the compression unit index, the criteria and information from the request object that describes the mapping of the column names to the decompressed compression unit for each column to row analyzer 756. Decompression manager 754 then signals applicable buffer manager 738.

In one embodiment, the compression unit index does not restart at zero at each portion of the file, however if it does, buffer metadata analyzer 718 or another element of FIG. 7 may maintain in the request object the number of compression units in portions of the file previously processed. In such embodiment, decompression manager 754 provides to row analyzer 756 the compression unit index as a number that does not restart at zero for each portion of the file, but continues increasing by one for each compression unit in the file.

When it receives the above information, row analyzer 756 compares the data in each row from all of the columns for which it received compression unit data to the criteria using the mapping information and identifies whether each such row actually meets the criteria. For each row that meets the criteria, row analyzer 756 outputs to the entity from which the request was received the row data from that row for all the columns it receives, and the row number, which is equal to the compression unit index (optionally modified as described above) it receives, multiplied by the number of rows per compression unit, plus the row number of the row in the compression unit. In one embodiment, columns of the row data are outputted in the same order as the compression units were provided to it, which decompression manager 754 provides according to the query specification, or using the order of the columns specified in the criteria in the request object.

When signaled by decompression manager 754 or compression unit manager 750, applicable buffer manager 738 selects the next compression unit index from the range or ranges on the applicable list, identifies the buffers to which the identified columns in the request object correspond, determines if any such buffers have not already been read, and reads any such buffers into processing storage 706 from long term storage 704. Applicable buffer manager 738 then provides pointers to the buffers it read in processing storage 706 that correspond to the selected compression unit index of all applicable columns, the compression unit index it selected, and the request object to compression unit manager 750, which repeats the process described above. When applicable buffer manager 738 determines there are no more compression unit indices on the applicable list, it signals applicable column identifier 712, which selects the next portion of the file, if any, and repeats the process described above following selection of the portion of the file. If there are no more portions of the file, applicable column identifier 712 indicates to row analyzer 756 that the process is complete, and row analyzer 756 indicates to the entity from which the request was received it is done providing rows and/or row identifiers.

Certain Embodiments of the Present Invention

Described is a computer-implemented method of providing portions of a computer file, including a database including two or more rows and columns, to fulfill a request for identifying some of the two or more rows in the computer database file that meet a criteria, the method performed by at least one hardware processor and including:

A. providing in computer storage at least a part of the computer database file as a set of two or more ordered buffers, each containing a variable number of one or more ordered compression units, each compression unit containing a compressed version of a fixed number of rows of a single column of the database, except for at least zero compression unit having a smaller number of rows than the fixed number where the compression unit includes a row of the database file adjacent to a border on the file, each of the at least one compression unit in a given buffer corresponding to a same column of the database as any other at least one compression unit in said given buffer, each buffer having an ending row that corresponds to the largest row of the column held by that buffer;

B. providing in computer storage metadata about each buffer in the at least the portion of the computer database file;

C. identifying two or more the two or more columns that are applicable to the request;

D. selecting an analysis point that is one row before a beginning row of the at least the part of the computer database file;

E. selecting a buffer for each column applicable to the request that contains a row immediately following the analysis point;

F. using the metadata about the selected buffers and the criteria to determine whether the criteria is or may be met by data in the computer database file corresponding to the selected buffers;

G. responsive to a determination that the criteria is or may be met by the data in the computer database file corresponding to the selected buffers:
adding to a list of applicable rows, a range having a beginning row immediately following the analysis point and an ending row equal to the smallest ending row among the buffers selected; and
moving the analysis point to the ending row of the range added;

H. responsive to a determination that the criteria cannot be met by the data in the database file corresponding to the selected buffers, moving the analysis point to the largest ending row among the buffers selected;

I. repeating, two or more times, steps E-H using the newly selected analysis point each time;

J. decompressing at least some of the compression units corresponding to the list of applicable rows for each of the two or more columns applicable to the request; and K. providing at least a portion of each of the decompressed compression units.

The method may include additional features whereby step J includes:

L. providing metadata about each compression unit including rows for each range of the applicable list and for each of the two or more columns that are applicable to the request;

M. selecting a first range of the list of applicable rows;

N. selecting as an additional analysis point the beginning row of the selected range;

O. selecting each compression unit for the two or more columns corresponding to the request that include a row corresponding to the additional analysis point;

P. using the metadata for the selected compression units and the criteria to determine whether the criteria is or may be met by data in the database file corresponding to the selected compression units;

Q. responsive to a determination that the criteria is or may be met by data in the database file corresponding to the selected compression units:
decompressing the selected compression units; and
moving the additional analysis point to the row after the last row in the selected compression unit if such row is in the selected range, or otherwise selecting another range and selecting as the additional analysis point the first row in such newly selected range;

R. responsive to a determination that the criteria cannot be met by data in the database file corresponding to the selected compression units, moving the additional analysis point to the row after the last row in the selected compression unit if such row is in the selected range, or otherwise selecting another range and selecting as the additional analysis point the first row in such newly selected range; and S. repeating steps O-R using the moved or newly selected additional analysis point until all compression units in all ranges of the applicable list have been processed using steps O-R.

The method may include additional features whereby the metadata for a compression unit is in the buffer containing the compression unit and at least one additional compression unit.

The method may include additional features whereby the at least the part of the computer database file includes one of two or more parts of the computer database file; and the method may additionally include repeating steps A-K for each of the two or more parts of the computer database file.

The method may include additional features whereby at least one compression unit is decompressed responsive to a dictionary that applies to less than all of the column corresponding to the at least one compression unit.

The method may include additional features whereby at least one compression unit is decompressed responsive to a compression strategy that applies to less than all of the column corresponding to the at least one compression unit.

Also described is a system for providing portions of a computer file, including a database including two or more rows and columns, to fulfill a request for identifying some of the two or more rows in the computer database file that meet a criteria, the system including:

the computer storage for providing at an output at least a part of the computer database file as a set of two or more ordered buffers, each containing a variable number of one or more ordered compression units, each compression unit containing a compressed version of a fixed number of rows of a single column of the database, except for at least zero compression unit having a smaller number of rows than the fixed number where the compression unit includes a row of the database file adjacent to a border on the file, each of the at least one compression unit in a given buffer corresponding to a same column of the database as any other at least one compression unit in said given buffer, each buffer having an ending row that corresponds to the largest row of the column held by that buffer, for providing at the computer storage output metadata about each buffer in the at least the portion of the computer database file, and for providing at the computer storage output information about each of the two or more columns;

an applicable column analyzer having an input for receiving the criteria and coupled to the computer storage output for receiving the information about each of the two or more columns, the applicable column analyzer for providing at an output identifiers of two or more the two or more columns that are applicable to the request;

a buffer metadata analyzer including a hardware computer processor and having an input coupled for receiving the criteria, coupled to the applicable column analyzer for receiving the identifiers of the two or more columns that are applicable to the criteria, and coupled the computer storage output for receiving the metadata about each buffer corresponding to the identifiers of the two or more columns that are applicable to the request, the buffer metadata analyzer for selecting an analysis point that is one row before a beginning row of the at least the part of the computer database file, for selecting a buffer for each column applicable to the criteria that contains a row immediately following the analysis point; for using the metadata about the selected buffers and the criteria to determine whether the criteria is or may be met by data in the computer database file corresponding to the selected buffers, and responsive to a determination that the criteria is or may be met by the data in the computer database file corresponding to the selected buffers, for providing at an output to an input of an applicable list manager that adds it via an output of the applicable list manager to a list of applicable rows, a range having a beginning row immediately following the analysis point and an ending row equal to the smallest ending row among the buffers selected, and for identifying the analysis point as the ending row of the range added to the applicable list and responsive to a determination that the criteria cannot be met by the data in the database file corresponding to the selected buffers, identifying the analysis point as the largest ending row among the buffers selected and for repeating such operation two or more times, starting from the selecting the buffer for each column, using the newly selected analysis point each time; and a decompression manager having an input coupled for receiving identifiers of compression units corresponding to at least some of at least one of the ranges of the applicable list and to the two or more columns that are applicable to the request, and to the computer storage output for receiving the compression units, the decompression manager for decompressing at least some of the compression units corresponding to the list of applicable rows for each of the two or more columns applicable to the request and providing at an output at least a portion of each of the decompressed compression units.

The system may include additional features whereby the computer storage is additionally for providing at the computer storage output metadata about each compression unit including rows for each range of the applicable list and for each of the two or more columns that are applicable to the request; and may additionally include a compression unit analyzer having an input for receiving the criteria and coupled to the computer storage for receiving at least some of the metadata about each compression unit including rows for each range of the applicable list for each of the two or more columns that are applicable to the request, and coupled to the applicable list manager output for receiving the applicable list, the compression unit analyzer for selecting a first range of the list of applicable rows, selecting as an additional analysis point the beginning row of the selected range, selecting each compression unit for the two or more columns corresponding to the request that include the row corresponding to the additional analysis point, for using the metadata for the selected compression units and the criteria to determine whether the criteria is or may be met by data in the database file corresponding to the selected compression units, and, responsive to a determination that the criteria is or may be met by data in the database file corresponding to the selected compression units, providing at an output identifiers of the compression units corresponding to the additional analysis point for each of the two or more columns that are applicable to the request; and moving the additional analysis point to the row after the last row in the selected compression unit if such row is in the selected range, or otherwise selecting another range and selecting as the additional analysis point the first row in such newly selected range, and responsive to a determination that the criteria cannot be met by data in the database file corresponding to the selected compression units, moving the additional analysis point to the row after the last row in the selected compression unit if such row is in the selected range, or otherwise selecting another range and selecting as the additional analysis point the first row in such newly selected range, and for repeating operation beginning with said selecting each compression unit, using the moved or newly selected additional analysis point until at least some of the compression units corresponding to the ranges of the applicable list have been processed; and wherein the decompression manager input is coupled to the compression unit analyzer output for receiving the identifiers of the compression units corresponding to the additional analysis point for each of the two or more columns that are applicable to the request output by the compression unit analyzer.

The system may include additional features whereby the metadata for a compression unit is contained in the buffer containing the compression unit and at least one additional compression unit.

The system may include additional features whereby the at least the part of the computer database file includes one of two or more parts of the computer database file; and the buffer metadata analyzer and the decompression manager repeat their operation described in claim 1 for each of the two or more parts of the computer database file.

The system may include additional features whereby the decompression manager decompresses at least one compression unit responsive to a dictionary that applies to less than all of the column corresponding to the at least one compression unit.

The system may include additional features whereby the decompression manager decompresses at least one compression unit responsive to a compression strategy that applies to less than all of the column corresponding to the at least one compression unit.

Also described is a computer program product including a computer useable medium having computer readable program code embodied therein for providing portions of a computer file, including a database including two or more rows and columns to fulfill a request identifying some of the two or more rows in the computer database file that meet a criteria, the computer program product including computer readable program code devices configured to cause a computer system to:
- A. provide at least a part of the computer database file as a set of two or more ordered buffers, each containing a variable number of one or more ordered compression units, each compression unit containing a compressed version of a fixed number of rows of a single column of the database, except for at least zero compression unit having a smaller number of rows than the fixed number where the compression unit includes a row of the database file adjacent to a border on the file, each of the at least one compression unit in a given buffer corresponding to a same column of the database as any other at least one compression unit in said given buffer, each buffer having an ending row that corresponds to the largest row of the column held by that buffer;
- B. provide metadata about each buffer in the at least the portion of the computer database file;
- C. identify two or more the two or more columns that are applicable to the request;
- D. select an analysis point that is one row before a beginning row of the at least the part of the computer database file;
- E. select a buffer for each column applicable to the request that contains a row immediately following the analysis point;
- F. use the metadata about the selected buffers and the criteria to determine whether the criteria is or may be met by data in the computer database file corresponding to the selected buffers;
- G. responsive to a determination that the criteria is or may be met by the data in the computer database file corresponding to the selected buffers:
  add to a list of applicable rows, a range having a beginning row immediately following the analysis point and an ending row equal to the smallest ending row among the buffers selected; and
  move the analysis point to the ending row of the range added;
- H. responsive to a determination that the criteria cannot be met by the data in the database file corresponding to the selected buffers, move the analysis point to the largest ending row among the buffers selected;
- I. repeat, two or more times, operation of the computer readable program code devices E-H using the newly selected analysis point each time;
- J. decompress at least some of the compression units corresponding to the list of applicable rows for each of the two or more columns applicable to the request; and
- K. provide at least a portion of each of the decompressed compression units.

The computer program product may include additional features whereby computer readable program code devices J comprise computer readable program code devices configured to cause the computer system to:
- L. provide metadata about each compression unit including rows for each range of the applicable list and for each of the two or more columns that are applicable to the request;
- M. select a first range of the list of applicable rows;
- N. select as an additional analysis point the beginning row of the selected range;
- O. select each compression unit for the two or more columns corresponding to the request that include a row corresponding to the additional analysis point;
- P. use the metadata for the selected compression units and the criteria to determine whether the criteria is or may be met by data in the database file corresponding to the selected compression units;
- Q. responsive to a determination that the criteria is or may be met by data in the database file corresponding to the selected compression units:
  decompress the selected compression units; and
  move the additional analysis point to the row after the last row in the selected compression unit if such row is in the selected range, or otherwise selecting another range and selecting as the additional analysis point the first row in such newly selected range;
- R. responsive to a determination that the criteria cannot be met by data in the database file corresponding to the selected compression units, move the additional analysis point to the row after the last row in the selected compression unit if such row is in the selected range, or otherwise selecting another range and selecting as the additional analysis point the first row in such newly selected range; and
- S. repeating operation of computer readable program code devices O-R using the moved or newly selected additional analysis point until all compression units in all ranges of the applicable list have been processed using steps O-R.

The computer program product may include additional features whereby the metadata for a compression unit is in the buffer containing the compression unit and at least one additional compression unit.

The computer program product may include additional features whereby the at least the part of the computer database file includes one of two or more parts of the computer database file; and the computer program product additionally includes computer readable program code devices configured to cause the computer system to repeat operation of computer readable program code devices A-K for each of the two or more parts of the computer database file.

The computer program product may include additional features whereby at least one compression unit is decompressed responsive to a dictionary that applies to less than all of the column corresponding to the at least one compression unit.

The computer program product may include additional features whereby at least one compression unit is decompressed responsive to a compression strategy that applies to less than all of the column corresponding to the at least one compression unit.

Each system element may include a conventional hardware processor or hardware processor system or processor system or processor that is coupled to a hardware memory 5 or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

What is claimed is:

1. A computer-implemented method of providing portions of a computer database file, the method comprising:
   (A) providing, by at least one hardware processor, in computer storage at least a part of the computer database file as a set of a plurality of buffers, each buffer in the plurality of buffers containing a variable number of one or more compression units, at least one compression unit of the one or more compression units containing a number of rows of at least one column of the computer database file, each compression unit of the one or more compression units in a given buffer corresponding to a same at least one column of the computer database file as any other at least one compression unit in said given buffer, each said buffer having an ending row that corresponds to a largest-indexed row of at least one column held by said buffer, the computer database file comprising a plurality of the rows and a plurality of columns;
   (B) providing in the computer storage, by the at least one hardware processor, metadata for each said buffer in the at least the part of the computer database file;
   (C) identifying, by the at least one hardware processor, the plurality of columns that are applicable to a request;
   (D) selecting, by the at least one hardware processor, an analysis point that is one row before a beginning row of the at least the part of the computer database file;
   (E) selecting, by the at least one hardware processor, one buffer of the plurality of buffers for each column applicable to the request that contains one of the plurality of rows immediately following the analysis point;
   (F) using, by the at least one hardware processor, the metadata for the selected one buffer for each column applicable to the request and a criteria to determine whether the criteria either (i) cannot be met, or (ii) can be met by data in the computer database file by comparing the data in the computer database file corresponding to the selected one buffer for each column applicable to the request;
   (G) responsive to a determination that the criteria can be met by the data in the computer database file corresponding to the selected one buffer for each column applicable to the request, adding, by the at least one hardware processor, to a list of applicable rows, a range having a beginning row immediately following the analysis point and an ending row equal to a smallest-indexed ending row among the selected one buffer for each column applicable to the request, and moving the analysis point to the ending row of the added range;
   (H) identifying, by the at least one hardware processor, the analysis point as the ending row of the added range and, responsive to a determination that the criteria cannot be met by the data in the computer database file corresponding to the selected one buffer for each column applicable to the request, moving the analysis point to the largest ending row among the selected one buffer for each column applicable to the request;
   (I) repeating, by the at least one hardware processor, a plurality of times, steps E-H using the analysis point most recently selected in steps G or H;
   (J) receiving, by the at least one hardware processor, identifiers of the compression units corresponding to at least some of the ranges of the list of applicable rows and the plurality of columns that are applicable to the request and decompressing at least some of the compression units corresponding to the identifiers of the compression units and to the list of applicable rows for each column of the plurality of columns that are applicable to the request; and
   (K) providing, by the at least one hardware processor, at least a portion of each decompressed compression unit of the decompressed compression units.

2. The method of claim 1 wherein step J comprises:
   (L) providing metadata about each compression unit comprising rows for each range of the list of applicable rows and for each column of the plurality of columns that are applicable to the request;
   (M) selecting a range of the list of applicable rows;
   (N) selecting as an additional analysis point the beginning row of the selected range;
   (O) selecting each compression unit for the plurality of columns that are applicable to the request that include a row corresponding to the additional analysis point;
   (P) using the metadata for the selected compression units and the criteria to determine whether the criteria either (i) cannot be met, or (ii) can be met, by data in the computer database file corresponding to the selected compression units;
   (Q) responsive to a determination that the criteria can be met by the data in the computer database file corresponding to the selected compression units:
      decompressing the selected compression units; and
      moving the additional analysis point to a row after a last row in one of the selected compression units if said row is in the selected range, or otherwise selecting another range and selecting the additional analysis point as a first row in said newly selected range;
   (R) responsive to a determination that the criteria cannot be met by the data in the computer database file corresponding to the selected compression units, moving the additional analysis point to a row after a last row in one of the selected compression units if such row is in the selected range, or otherwise selecting another range and selecting as the additional analysis point a first row in such newly selected range; and
   (S) repeating steps O-R using the moved or newly selected additional analysis point until all compression units in all ranges of the list of applicable rows have been processed using steps O-R.

3. The method of claim 2, wherein:
the at least one compression unit comprises a plurality of compression units; and
the metadata for at least one of the plurality of compression units is in a buffer containing said at least one compression unit and at least one additional compression unit of the plurality of compression units.

4. The method of claim 1:
wherein the at least the part of the computer database file comprises one of a plurality of parts of the computer database file; and
the method additionally comprises repeating steps A-K for each part of the plurality of parts of the computer database file.

5. The method of claim 1, wherein:
each compression unit is at least partly compressed; and
at least a part of at least one compression unit is decompressed in step J responsive to a dictionary that applies to less than all of the at least one column corresponding to the at least one compression unit.

6. The method of claim 1, wherein:
each compression unit is at least partly compressed; and
at least a part of at least one compression unit is decompressed in step J responsive to a compression strategy that applies to less than all of the at least one column corresponding to said at least one compression unit.

7. A system for providing portions of a computer database file, comprising a database comprising a plurality of rows and a plurality of columns, the system comprising:
a computer storage for providing at an output at least a part of the computer database file as a set of a plurality of buffers, each buffer in the plurality of buffers containing a variable number of one or more compression units, at least one of the compression units containing a number of the rows of at least one of the columns of the computer database file, each compression unit of the one or more compression units in a given buffer of the plurality corresponding to a same at least one column of the computer database file as any other at least one compression unit in said given buffer, each said buffer in the plurality of buffers having an ending row that corresponds to a largest-indexed row of the at least one column held by said buffer, the computer storage additionally for providing at the computer storage output metadata for each said buffer in the at least the part of the computer database file, and for providing at the computer storage output information of each column of the plurality of columns;
an applicable column analyzer having an input for receiving a criteria and coupled to the computer storage output for receiving the information of each said column of the plurality of columns, the applicable column analyzer for providing at an output identifiers of the plurality of columns that are applicable to a request;
a buffer metadata analyzer comprising a hardware computer processor and having an input coupled for receiving the criteria, coupled to the applicable column analyzer output for receiving the identifiers of the plurality of columns that are applicable to the request, and coupled the computer storage output for receiving the metadata for each said buffer corresponding to the identifiers of the plurality of columns that are applicable to the request, the buffer metadata analyzer for:
selecting an analysis point that is one row before a beginning row of the at least the part of the computer database file,
selecting one buffer of the plurality of buffers for each column in the plurality applicable to the criteria that contains one of the plurality of rows immediately following the analysis point,
using the metadata for the selected one buffer for each column applicable to the request and the criteria to determine whether the criteria either (i) cannot be met, or (ii) can be met by data in the computer database file corresponding to the selected one buffer of the plurality of buffers for each column in the plurality applicable to the criteria, and responsive to a determination that the criteria can be met by the data in the computer database file corresponding to the selected one buffer for each column applicable to the request, providing at an output to an input of an applicable list manager that adds it via an output of the applicable list manager to a list of applicable rows, a range having a beginning row immediately following the analysis point and an ending row equal to a smallest-indexed ending row among the selected one buffer for each column applicable to the request and moving the analysis point to the ending row of the added range, thereby identifying the analysis point as the ending row of the added range and
responsive to a determination that the criteria cannot be met by the data in the computer database file corresponding to the selected one buffer for each column applicable to the request, identifying the analysis point as a largest-indexed ending row among the selected one buffer of the plurality of buffers for each column in the plurality applicable to the criteria buffers and
repeating an operation, starting from the selecting the one buffer of the plurality of buffers for each column, using the newly selected analysis point; and
a decompression manager having an input for receiving identifiers of compression units corresponding to at least some of the ranges of the list of applicable rows and the plurality of the columns that are applicable to the request, and to the computer storage output for receiving the compression units corresponding to said identifiers, the decompression manager for decompressing at least some of the compression units corresponding to the identifiers of the compression units and to the list of applicable rows for each column of the plurality of columns that are applicable to the request and for providing at an output at least a portion of each decompressed compression unit of the decompressed compression units.

8. The system of claim 7:
wherein the computer storage is additionally for providing at the computer storage output metadata for each compression unit comprising information about the rows for each range of the list of applicable rows and for each column of the plurality of columns that are applicable to the request; and
additionally comprising a compression unit analyzer having an input for receiving the criteria and coupled to the computer storage output for receiving at least some of the metadata for each compression unit comprising rows for each range of the list of applicable rows for each column of the plurality of columns that are applicable to the request, and to the compression unit analyzer input coupled to the applicable list manager output, for receiving the list of applicable rows, the compression unit analyzer for:
selecting a first range of the list of applicable rows,
selecting an additional analysis point as the beginning row of the selected range,
selecting each compression unit for the plurality of columns that are applicable to the request that include a row corresponding to the additional analysis point, using the metadata for the selected compression units and the criteria to determine whether the criteria either (i) cannot be met, or (ii) can be met by data in the computer database file corresponding to the selected compression units, responsive to a determination that the criteria can be met by the data in the computer database file corresponding to the selected compression units, providing at an output identifiers of the compression units corresponding to the additional analysis point for each column of the plurality of columns that are applicable to the request, and moving the additional analysis point to a row after a last row in one of the selected compression units if said row is in the selected range, or otherwise selecting another range and selecting as the additional analysis point a first row in said newly selected range, responsive to a determination that the criteria cannot be met by the data in the computer database file corresponding to the selected compression units, moving the additional analysis point to a row after the last row in one of the selected compression units if the row is in the selected range, or otherwise selecting another range from the list of applicable rows and selecting the additional analysis point as a first row in the newly selected range, and for repeating operation beginning with said selecting each compression unit, using the moved or newly selected additional analysis point until at least some of the compression units corresponding to the ranges of the list of applicable rows have been processed; and wherein the decompression manager input is coupled to the compression unit analyzer output for receiving the identifiers of the compression units corresponding to the additional analysis point for each column of the plurality of columns that are applicable to the request that are output by the compression unit analyzer.

9. The system of claim 8, wherein:

the one or more compression units comprises a plurality of compression units; and the metadata for at least one of the plurality of compression units is contained in the buffer containing said at least one compression units and at least one additional compression unit.

10. The system of claim 7, wherein:

the at least the part of the computer database file comprises one of a plurality of parts of the computer database file; and the buffer metadata analyzer, the applicable list manager, and the decompression manager repeat their operation for each part of the plurality of parts of the computer database file.

11. The system of 7, wherein:

each compression unit is at least partly compressed; and the decompression manager decompresses at least a part of at least one of the at least some of the compression units responsive to a dictionary that applies to less than all of the at least one column corresponding to said at least one compression unit.

12. The system of claim 7, wherein:

each compression unit is at least partly compressed; and the decompression manager decompresses at least a part of at least one of the at least some of the compression units responsive to a compression strategy that applies to less than all of the at least one column corresponding to said at least one compression unit.

13. A computer program product embodied in a nontransitory computer useable medium having computer readable program code for providing portions of a computer database file, the computer program product comprising computer readable program code devices configured to cause a computer system to:

(A) provide at least a part of the computer database file as a set of a plurality of buffers, each buffer in the plurality of buffers containing a variable number of one or more compression units, at least one compression unit of the one or more compression units containing a number of rows of at least one column of the computer database file, each said compression unit of the one or more compression units in a given buffer corresponding to a same at least one column of the computer database file as any other at least one compression unit in said given buffer, each said buffer having an ending row that corresponds to largest-indexed row of at least one column held by said buffer, the computer database file comprising a plurality of the rows and a plurality of columns;

(B) provide in the computer storage metadata for each said buffer in the at least the part of the computer database file;

(C) identify the plurality of columns that are applicable to a request;

(D) select an analysis point that is one row before a beginning row of the at least the part of the computer database file;

(E) select one buffer of the plurality of buffers for each column applicable to the request that contains one of the plurality of rows immediately following the analysis point;

(F) use the metadata for the selected one buffer for each column applicable to the request and a criteria to determine whether the criteria either (i) cannot be met, or (ii) can be met by data in the computer database file by comparing the data in the computer database file corresponding to the selected one buffer for each column applicable to the request;

(G) responsive to a determination that the criteria can be met by the data in the computer database file corresponding to the selected one buffer for each column applicable to the request, add to a list of applicable rows, a range having a beginning row immediately following the analysis point and an ending row equal to a smallest-indexed ending row among the selected one buffer for each column applicable to the request, and move the analysis point to the ending row of the added range;

(H) identify the analysis point as the ending row of the added range and, responsive to a determination that the criteria cannot be met by the data in the computer database file corresponding to the selected one buffer for each column applicable to the request, move the analysis point to the largest ending row among the selected one buffer for each column applicable to the request;

(I) repeat, a plurality of times, operation of the computer readable program code devices E-H using the analysis point most recently selected by computer readable code devices G or H;

(J) receive identifiers of compression units corresponding to at least some of at least one of the ranges of the list of applicable rows and the plurality of columns that are applicable to the request and decompress at least some of the compression units corresponding to the list of applicable rows for each column of the plurality of columns that are applicable to the request; and (K) provide at least a portion of each decompressed compression unit of the decompressed compression units.

14. The computer program product of claim 13 wherein computer readable program code devices J comprise computer readable program code devices configured to cause the computer system to:

(L) provide metadata for each compression unit comprising rows for each range of the list of applicable rows and for each column of the plurality of columns that are applicable to the request;

(M) select a range of the list of applicable rows;

(N) select as an additional analysis point the beginning row of the selected range;

(O) select each compression unit for the plurality of columns that are applicable to the request that include a row corresponding to the additional analysis point;

(P) use the metadata for the selected compression units and the criteria to determine whether the criteria either (i) cannot be met, or (ii) can be met by data in the computer database file corresponding to the selected compression units;

(Q) responsive to a determination that the criteria can be met by the data in the computer database file corresponding to the selected compression units:
decompress the selected compression units; and
move the additional analysis point to a row after a last row in one of the selected compression units if said row is in the selected range, or otherwise selecting another range and selecting the additional analysis point as a first row in the newly selected range;

(R) responsive to a determination that the criteria cannot be met by the data in the computer database file corresponding to the selected compression units, move the additional analysis point to a row after a last row in one of the selected compression units if the row is in the selected range, or otherwise selecting another range and selecting as the additional analysis point for a first row in the newly selected range; and (S) repeating operation of computer readable program code devices O-R using the moved or newly selected additional analysis point until all compression units in all ranges of the list of applicable rows have been processed using steps O-R.

15. The computer program product of claim 14, wherein:
the at least one compression unit comprises a plurality of compression units; and
the metadata at least one of the plurality of compression units is in a buffer containing said at least one compression unit and at least one additional of the plurality of compression units.

16. The computer program product of claim 13:
wherein the at least the part of the computer database file comprises one of a plurality of parts of the computer database file; and
the computer program product additionally comprises computer readable program code devices configured to cause the computer system to repeat operation of computer readable program code devices A-K for each part of the plurality of parts of the computer database file.

17. The computer program product of claim 13, wherein:
each compression unit is at least partly compressed; and
at least a part of at least one compression unit is decompressed by computer readable program code device J responsive to a dictionary that applies to less than all of the at least one column corresponding to the at least one compression unit.

18. The computer program product of claim 13, wherein:
each compression unit is at least partly compressed; and
at least a part of at least one compression unit is decompressed by computer readable program code device J responsive to a compression strategy that applies to less than all of the at least one column corresponding to said at least one compression unit.

* * * * *